United States Patent
Mori et al.

(10) Patent No.: US 10,853,721 B2
(45) Date of Patent: Dec. 1, 2020

(54) MULTIPLIER ACCUMULATOR, NETWORK UNIT, AND NETWORK APPARATUS

(71) Applicant: Kabushiki Kaisha Toshiba, Minato-ku (JP)

(72) Inventors: Masafumi Mori, Yokkaichi (JP); Takao Marukame, Chuo (JP); Tetsufumi Tanamoto, Kawasaki (JP); Satoshi Takaya, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 659 days.

(21) Appl. No.: 15/685,042

(22) Filed: Aug. 24, 2017

(65) Prior Publication Data

US 2018/0211154 A1    Jul. 26, 2018

(30) Foreign Application Priority Data

Jan. 25, 2017  (JP) .................................. 2017-011486

(51) Int. Cl.
*G06N 3/063*   (2006.01)
*G06N 3/04*    (2006.01)

(52) U.S. Cl.
CPC ......... *G06N 3/0445* (2013.01); *G06N 3/0472* (2013.01); *G06N 3/063* (2013.01)

(58) Field of Classification Search
CPC .......... G06N 3/02; G06N 3/04; G06N 3/0445; G06N 3/0472; G06N 3/0481; G06N 3/06;
(Continued)

(56) References Cited

U.S. PATENT DOCUMENTS 5,630,024 A    5/1997  Aihara et al.
2007/0185951 A1*  8/2007  Lee .................... G06F 7/49947
                                                 708/493

FOREIGN PATENT DOCUMENTS

JP    6-152330    5/1994
JP    8-30572     2/1996
(Continued)

OTHER PUBLICATIONS

K Ueyoshi et al., FPGA Implementation of a Scalable and Highly Parallel Architecture for Restricted Boltzmann Machines, Circuits and Systems, 7, 2132-2141, 2016 (Year: 2016).*
(Continued)

*Primary Examiner* — Andrew Caldwell
*Assistant Examiner* — Emily E Larocque
(74) *Attorney, Agent, or Firm* — Oblon, McClelland, Maier & Neustadt, L.L.P.

(57) ABSTRACT

According to an embodiment, a multiplier accumulator includes a controller, a high-order multiplier, a high-order accumulator, a low-order multiplier, and an output unit. The controller is configured to designate each digit within a range of the most significant digit in a coefficient for an input value to a stop digit as a target digit. The high-order multiplier is configured to calculate a high-order multiplication value by multiplying the input value, and a value and a weight of the target digit. The high-order accumulator is configured to calculate a high-order accumulation value by accumulatively adding the high-order multiplication values for input values. The low-order multiplier is configured to calculate a low-order multiplication value by multiplying an input value and a value of a digit smaller than the stop digit. The output unit is configured to output a value determined based on whether the high-order accumulation value exceeds a boundary value.

18 Claims, 15 Drawing Sheets

(58) Field of Classification Search
CPC ....... G06N 3/063; G06F 7/5443; G06F 17/10; G06F 17/16; G06F 17/17
USPC .................................................. 708/523, 603
See application file for complete search history.

(56) References Cited

FOREIGN PATENT DOCUMENTS

| | | |
|---|---|---|
| JP | 9-101944 | 4/1997 |
| JP | 2008-85923 | 4/2008 |
| JP | 2009-65515 | 3/2009 |

OTHER PUBLICATIONS

M. Prezioso et al., Training an operation of an integrated neuromorphic network based on metal-oxide memristors, Research Letter, Nature, vol. 521, 2015 (Year: 2015).*

T. Marukame et al., Proposal, analysis and demonstration of Analog/Digital-mixed Neural Networks based on memristive device arrays, 2018 IEEE International Symposium on Circuits and Systems (ISCAS) 2018 (Year: 2018).*

Search Report by Registered Search Organization, Printout of Inquiry of History Information, J-PlatPat [JPP], search report by Japan Patent Office for foreign priority document JP 2017011486, 2019 (Year: 2019).*

Takao Marukame et al., "Error Tolerance Analysis of Deep Learning Hardware Using a Restricted Boltzmann Machine Toward Low= Power Memory Implementation", IEEE Transactions on Circuits and Systems II, IEEE Transactions on Circuits and Systems—II: Express Briefs, vol. 64 No. 4, Apr. 2017 (Year: 2017).*

Takao Marukame et al., "Error Tolerance Analysis of Deep Learning Hardware Using a Restricted Boltzmann Machine Toward Low-Power Memory Implementation," IEEE Transactions on Circuits and Systems II, Express Briefs, vol. 64, No. 4, Apr. 2017, pp. 5.

K. Aihara, et al. "A Sparse Memory-Access Neural Network Engine with 96 Parallel Data-Driven Processing Units," ISSCC95, Session 4, Neural Networks, Paper WP 4.5, IEEE International Solid-State Circuits Conference, Feb. 1995, pp. 3.

* cited by examiner

FIG. 4

| k | 0 (MSB SIGN) | 1 | 2 | 3 | 4 | 5 | 6 | 7 | 8 | 9 | 10 | 11 | 12 (STOP DIGIT s) | 13 | 14 | 15 | 16 | 17 | 18 (LSB) |
|---|---|---|---|---|---|---|---|---|---|---|---|---|---|---|---|---|---|---|---|
| $w_1$ | 1 | 0 | 0 | 1 | 0 | 1 | 1 | 1 | 0 | 1 | 1 | 0 | 1 | 0 | 1 | 1 | 1 | 1 | 1 |
| $w_2$ | 0 | 0 | 1 | 1 | 1 | 1 | 0 | 0 | 0 | 1 | 0 | 0 | 0 | 1 | 1 | 1 | 1 | 0 | 1 |
| $w_3$ | 1 | 1 | 1 | 0 | 1 | 1 | 1 | 0 | 1 | 0 | 0 | 0 | 0 | 1 | 0 | 0 | 0 | 0 | 0 |
| $w_4$ | 0 | 0 | 0 | 0 | 1 | 0 | 0 | 1 | 0 | 0 | 0 | 0 | 0 | 0 | 1 | 0 | 0 | 0 | 0 |
| ... | | | | | | | | | | | | | | | | | | | |
| $w_N$ | 1 | 0 | 1 | 0 | 1 | 0 | 1 | 1 | 1 | 1 | 0 | 1 | 1 | 1 | 1 | 1 | 1 | 1 | 1 |

Columns 0–12: FIRST MEMORY
Columns 13–18: SECOND MEMORY

MULTIPLIER ACCUMULATOR, NETWORK UNIT, AND NETWORK APPARATUS

CROSS-REFERENCE TO RELATED APPLICATIONS

This application is based upon and claims the benefit of priority from Japanese Patent Application No. 2017-011486, filed on Jan. 25, 2017; the entire contents of which are incorporated herein by reference.

FIELD

Embodiments described herein relate generally to a multiplier accumulator a network unit, and a network apparatus.

BACKGROUND

A deep learning technology using a neural network is known. A technology for deep learning using dedicated hardware has also been studied.

In each unit included in the neural network, product-sum operation (multiplication accumulation) is executed. That is, in each unit, each of a plurality of input values received from the unit at a preceding stage is multiplied by a coefficient, and multiple input values are added after multiplication by the coefficient. Further, in each unit, the calculated value is given to an activation function such as a sigmoid function. Then, each unit outputs the output value of the activation function.

A neural network apparatus realized by hardware is required to have a large number of such units. Therefore, when realizing a neural network with hardware, it is desired to achieve both high-speed processing of individual units and low power consumption.

BRIEF DESCRIPTION OF THE DRAWINGS

FIG. 4 is a view illustrating an image of coefficients stored in a coefficient storage;

DETAILED DESCRIPTION

According to an embodiment a multiplier accumulator includes a coefficient storage, a controller, a high-order multiplier, a high-order accumulator, a low-order multiplier, and an output unit. The coefficient storage is configured to store N coefficients corresponding to N input values on a one-to-one basis where N is an integer equal to or greater than two. Each coefficient has a value indicating a sign at the most significant digit. The controller is configured to designate each of a plurality of digits within a range of the most significant digit to a predetermined stop digit as a target digit. The high-order multiplier is configured to calculate a high-order multiplication value obtained by multiplying a corresponding input value, a value of the target digit in a corresponding coefficient, and a weight of the target digit, for each of the N input values. The high-order accumulator is configured to calculate a high-order accumulation value obtained by accumulatively adding the high-order multiplication values. The low-order multiplier is configured to calculate a low-order multiplication value by multiplying a corresponding input value and a value of a digit smaller than the stop digit in a corresponding coefficient, for each of the N input values. The output unit is configured to output, when the high-order accumulation value exceeds a preset boundary value, a value in a range after passing the boundary value as the multiplication accumulation value. The output unit is also configured to output, when the high-order accumulation value does not exceed the boundary value even when the high-order multiplication value is calculated by designating the stop digit as the target digit, a value obtained by adding, to the high-order accumulation value, the low-order accumulation value obtained by accumulatively adding the low-order multiplication values, as the multiplication accumulation value.

Figure 1:
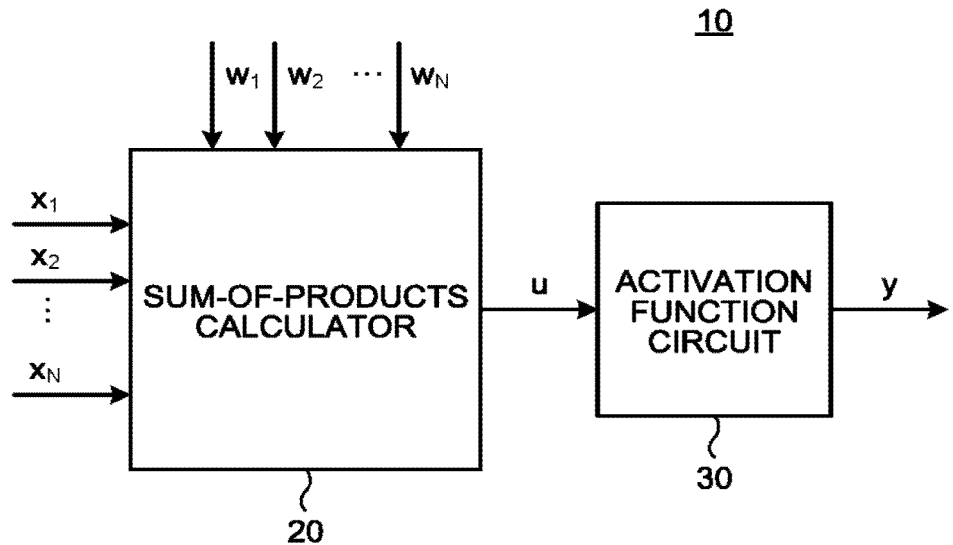
FIG. 1 is a configuration diagram of a network unit according to an embodiment.

FIG. 1 is a diagram illustrating a configuration of a network unit 10 according to an embodiment. The network unit 10 is used as a component of each layer such as a multilayer neural network, for example. The network unit 10 is realized by hardware such as a semiconductor device, for example.

The network unit 10 includes a sum-of-products calculator 21 (a multiplier accumulator) and an activation function circuit 30. The sum-of-products calculator 20 externally receives N input values and N coefficients. N is an integer of 2 or more. The N coefficients correspond one-to-one to N input values.

The sum-of-products calculator 20 receives N coefficients from, for example, an external learning device and stores them internally. The sum-of-products calculator 20 also receives N input values from other units. Upon receipt of N input values, the sum-of-products calculator 20 starts product-sum operation processing (multiplication accumulation processing).

In the present embodiment, N input values are denoted as $x_1, x_2, x_3, \ldots, x_N$. Also, the N coefficients are denoted as $w_1, w_2, w_3, \ldots, w_N$. Subscript characters denote indexes. The input value and the coefficient having the same index correspond to each other. Specifically, $x_1$ and $w_1$ correspond to each other, $x_2$ and $w_2$ correspond to each other, and $x_N$ and $w_N$ correspond to each other. Also, the input value of an arbitrary index is denoted by $x_i$, a coefficient of an arbitrary index is represented by $x_1$, and i is an integer from 1 to N.

When receiving N input values from the outside, the sum-of-products calculator 20 executes a product-sum operation (multiplication accumulation) processing to calculate a multiplication accumulation value. That is, the sum-of-products calculator 20 calculates a multiplication accumulation value by accumulating N multiplication values obtained by multiplying each of the N input values by a corresponding coefficient. That is, the sum-of-products calculator 20 executes operation processing of the following Equation (11).

$$u = \sum_{i=1}^{N} w_i \cdot x_i \tag{11}$$

where u represents an intermediate value; the dot represents multiplication.

The sum-of-products calculator 20 outputs the multiplication accumulation value thus calculated to the activation function circuit 30 as an intermediate value. The activation function circuit 30 receives the intermediate value from the sum-of-products calculator 20. The activation function circuit 30 converts the intermediate value into an output value according to a preset activation function. That is, the activation function circuit 30 executes operation processing of the following Equation (12).

$$y = f(u) \tag{12}$$

where f( ) represents an activation function; y represents an output value.

Then, the network unit 10 supplies the output value output from the activation function circuit 30 to another unit. Note that the network unit 10 may further include an addition circuit between the sum-of-products calculator 20 and the activation function circuit 30. The addition circuit receives in advance a bias value from a learning device, for example, and stores the bias value therein. The addition circuit adds an added value obtained by adding the multiplication accumulation value output from the sum-of-products calculator 20 and the bias value to the activation function circuit 30 as an intermediate value.

Figure 2:
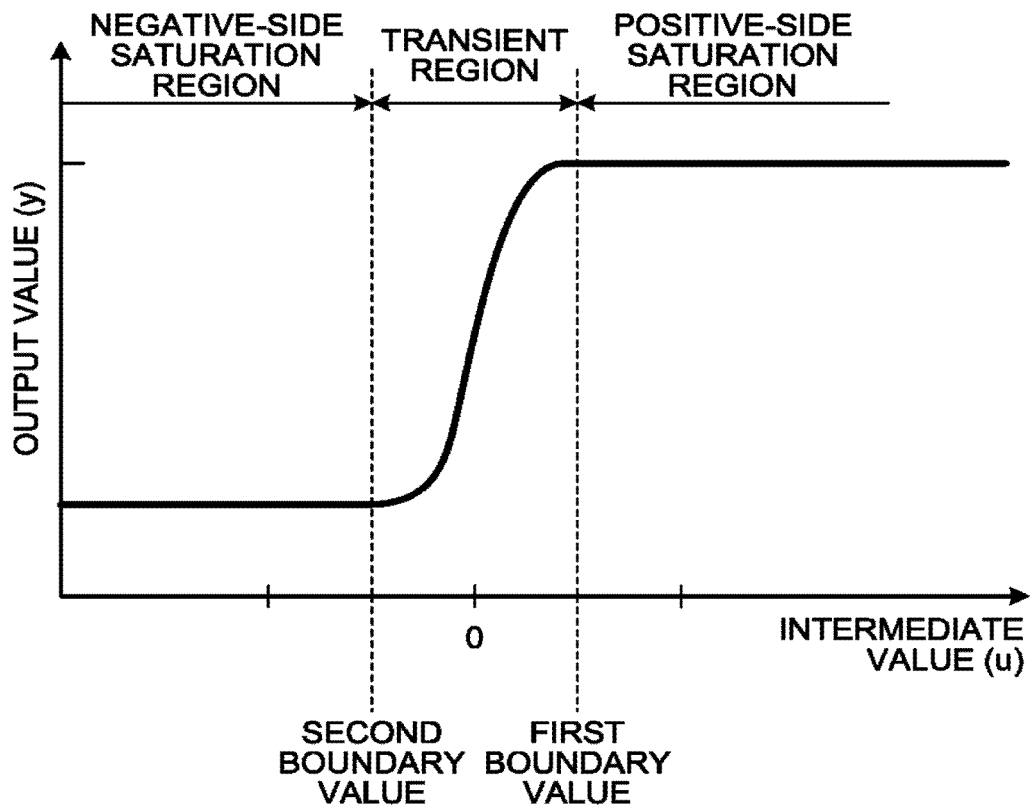
FIG. 2 is a diagram illustrating an example of an activation function.

FIG. 2 is a diagram illustrating an example of an activation function. For example, in the activation function, as the absolute value of an independent variable (intermediate value) increases, the value of a dependent variable (output value) becomes saturated and becomes constant. For example, when the independent variable (intermediate value) changes to the positive side, the activation function increases such that the value of the dependent variable (output value) approaches a predetermined positive value asymptotically. Also, when the independent variable (intermediate value) changes to a negative-side, the activation function decreases such that the value of the dependent variable (output value) approaches a predetermined positive value asymptotically.

For example, the activation function may be a sigmoid function as illustrated in FIG. 2. The activation function may be a nonlinear function other than the sigmoid function as long as the activation function is a function having the above characteristics.

In a region where the absolute value of the independent variable (intermediate value) in the activation function is large, the change of the dependent variable (output value) is small and the region is saturated. A region where the absolute value of the independent variable (intermediate value) in the activation function is large is called a saturation region. A saturation region where the independent variable (intermediate value) in the activation function is positive is called a positive-side saturation region. A saturation region where the independent variable (intermediate value) in the activation function is positive is called a negative-side saturation region. Further, a region that is not a saturation region in the activation function, that is, a region where the absolute value of the independent variable (intermediate value) in the activation function is small is called a transient region.

Here, even if the change in the intermediate value in the saturation region is large, the change in the output value of the activation function is small. That is, the saturation region has a small influence on the accuracy of the output value. On the other hand, the activation function has a large change in the output value even if the change in the intermediate value in the transient region is small. That is, the transient region has a small large influence on the accuracy of the output value.

Therefore, the sum-of-products calculator 20 executes processing with high accuracy when the intermediate value is a transient region. On the contrary, when the intermediate value is the saturation region, the sum-of-products calculator 20 executes the processing with low accuracy but high speed and low power consumption.

Figure 3:
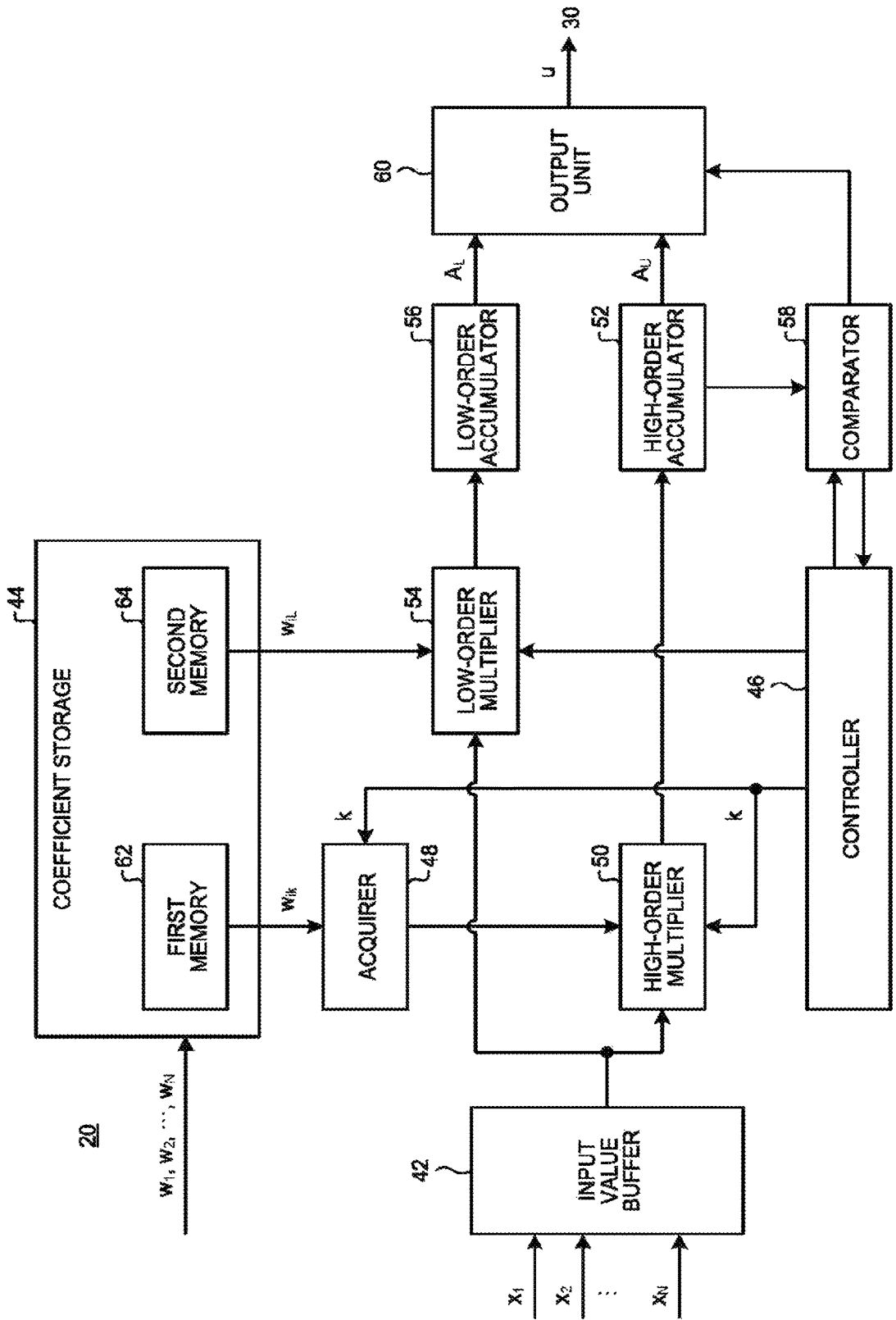
FIG. 3 is a configuration diagram of a sum-of-products calculator.

FIG. 3 is a diagram illustrating a configuration of the sum-of-products calculator 20. The sum-of-products calculator 20 includes an input value buffer 42, a coefficient storage 44, a controller 46, an acquirer 48, a high-order multiplier 50, a high-order accumulator 52, a low-order multiplier 54, a low-order accumulator 56, a comparator 58, and an output unit 60.

The input value buffer 42 receives N input values from the outside. For example, the input value buffer 42 receives $x_1, x_2, x_3, \ldots, x_N$ as N input values. Then, the input value buffer 42 holds the received N input values.

Each of the N input values is, for example, signed binary number data. For example, each of the N input values may be binary number data expressed in 2's complement representation. Note that each of the N input values may be one bit data or may be data expressed in absolute value (data without sign).

Prior to the operation processing, the coefficient storage 44 previously receives and stores N coefficients corresponding to N input values on a one-to-one basis. For example, the coefficient storage 44 stores $w_1, w_2, w_3, \ldots, w_N$ as N coefficients. The coefficient storage 44 has, for example, a nonvolatile characteristic and continues to store N coefficients even when the supply of the power supply voltage is stopped.

The N coefficients have a predetermined number of digits. Each of the N coefficients includes a digit representing a sign and at least one digit representing an absolute value. For example, in each of the N coefficients, the value of the most significant digit represents a sign. Also, in each of the N coefficients, the range from the least significant digit to the digit one digit lower than the most significant digit represents the absolute value. For example, each of the N coefficients is signed binary data of the same bit width. For example, each of the N coefficients may be binary data having the same bit width expressed in 2's complement representation.

The coefficient storage 44 includes a first memory 62 and a second memory 64. Each of the first memory 62 and the second memory 64 is a nonvolatile memory.

The first memory 62 stores the value of the stop digit and the value of the digit higher than the stop digit in each of the N coefficients. Here, the stop digit is any preset arbitrary digit which is larger than the least significant digit and smaller than the most significant digit. The first memory 62 can read the values of each of the N coefficients on a unit of digit (for example, on a unit of bit).

The second memory 64 stores the value of the digit lower than the stop digit in each of the N coefficients. The second memory 64 may have a higher read error rate than the first memory 62. For example, the second memory 64 may have a simpler configuration or lower reliability than the first memory 62. In addition, the second memory 64 may be operated by applying a lower power supply voltage than the first memory 62.

The controller 46 controls the operation timing and the like of the entire circuit. Furthermore, when the operation processing is started, the controller 46 designates each of the plurality of digits from the most significant digit to the predetermined stop digit in the coefficient sequentially from the higher order side as a target digit. The controller 46 gives the designated target digit to the acquirer 48 and the high-order multiplier 50.

For example, the controller 46 designates integers from 0 to s in ascending order one by one as a target digit (k). Here, k=0 represents the most significant digit (eg, MSB); k=1 represents one digit lower than the most significant digit; k=2 represents two digits lower than the most significant digit; s represents the number of digits of the stop digit counted from the most significant digit.

For example, the controller 46 designates a new target digit after the high-order multiplier 50 calculates all the high-order multiplication values of the N input values. Then, after designating the stop digit as the target digit, the controller 46 stops the designation of the new target digit.

In addition, the controller 46 gives an instruction to start operation to the low-order multiplier 54 at a predetermined timing after starting the operation processing. For example, the controller 46 gives an operation start instruction to the low-order multiplier 54 after all the multiplication processing by the high-order multiplier 50 has been completed up to the stop digits. The controller 46 may give an instruction to start operation to the low-order multiplier 54 before the multiplication processing by the high-order multiplier 50 is completed up to the stop digit. For example, the controller 46 may give an operation start instruction to the low-order multiplier 54 when designating a predetermined digit before the stop digit as the target digit. Further, when designating the stop digit as the target digit, the controller 46 notifies the comparator 58 that the stop digit is designated as the target digit.

Each time the target digit is designated, the acquirer 48 sequentially reads the value of the target digit of each of the N coefficients from the coefficient storage 44. Then, the acquirer 48 sequentially gives the value of the target digit of each of the N coefficients to the high-order multiplier 50.

Every time the target digit is designated, the high-order multiplier 50 sequentially reads the N input values from the input value buffer 42. Along with this, the high-order multiplier 50 receives the value of the target digit in the coefficient corresponding to the read input value from the acquirer 48.

Every time the target digit is designated, for each of the N input values, the high-order multiplier 50 calculates a high-order multiplication value obtained by multiplying the corresponding input value, the value of the target digit in the corresponding coefficient, and the weight of the target digit. When the coefficient is binary data, the weight of the least significant digit is $2^0=1$, the weight of the second digit from the least significant digit is $2^1=2$, and the weight of the least significant digit to the cth digit is $2^{(c-1)}$. The high-order multiplier 50 sequentially supplies the N high-order multiplication values calculated for each of the N input values to the high-order accumulator 52.

Every time the high-order multiplication value for any input value is calculated by the high-order multiplier 50, the high-order accumulator 52 calculates a high-order accumulation value obtained by accumulatively adding high-order multiplication values. Specifically, the high-order accumulator 52 adds the high-order multiplication value newly calculated by the high-order multiplier 50 to the high-order accumulation value already stored, and updates the high-order accumulation value.

As presented in Equation (13), the above described high-order multiplier 50 and high-order accumulator 52 sequentially execute operation processing from the most significant digit toward the lowest digit one digit at a time.

$$A_U = \sum_{k=0}^{s} \left( \sum_{i=1}^{N} w_{ik} \cdot x_i \right) \qquad (13)$$

where $A_U$ represents the high-order accumulation value; k is an integer equal to or larger than 0 and illustrates a digit position of a target digit from the most significant digit. When the target digit is the most significant digit, k=0. Here, k is the number of digits from the most significant digit of the stop digit; $w_{ik}$ represents the value multiplied by the input value when the target digit is k.

Here, by a circuit that executes a first operation expression in which the result of multiplication of the value of the digit lower than the most significant digit and the corresponding input value is 0 or positive, the high-order multiplier 50 calculates the high-order multiplication value.

That is, the high-order multiplier 50 realizes the calculation of $(w_{ik} \cdot x_i)$ presented in Equation (13) by a circuit that executes the first operation expression. As a result, the high-order accumulator 52 can increase (not decrease) the high-order accumulation value after executing the multiplication processing on the most significant digit (code). Note that the first operation expression will be further described with reference to FIGS. 7, 8, and 9.

Instead of the first operation expression, by a circuit which executes a second operation expression in which the result of multiplication of the value of the digit lower than the most significant digit and the corresponding input value is 0 or negative, the high-order multiplier 50 may calculate the high-order multiplication value. That is, the high-order multiplier 50 may realize the calculation of $(w_{ik} \cdot x_i)$ presented in Equation (13) by a circuit that executes the second operation expression. As a result, the high-order accumulator 52 can decrease (not increase) the high-order accumulation value after calculating the most significant digit. Note that the second operation expression will be further described with reference to FIGS. 10, 11 and 12.

The low-order multiplier 54 receives an instruction to start multiplication from the controller 46 at a predetermined timing. Upon receipt of the instruction to start multiplication, the low-order multiplier 54 sequentially reads the N input values from the input value buffer 42. Along with this, the low-order multiplier 54 reads from the coefficient storage 44 the value of the digit smaller than the stop digit in the coefficient corresponding to the read input value.

Then, for each of the N input values, the low-order multiplier 54 sequentially calculates low-order multiplication values obtained by multiplying the corresponding input value and the digit value smaller than the stop digit in the corresponding coefficient. The low-order multiplier 54 sequentially supplies the N low-order multiplication values calculated for each of the N input values to the low-order accumulator 56.

The low-order accumulator 56 calculates a low-order accumulation value obtained by accumulatively adding a low-order multiplication value each time a low-order multiplying value for any input value is calculated. Specifically, the low-order accumulator 56 adds the low-order multiplication value newly calculated by the low-order multiplier 54 to the low-order accumulation value already stored, and updates the low-order accumulation value.

The low-order multiplier 54 and the low-order accumulator 56 as described above execute operation processing as presented in Equation (14).

$$A_L = \sum_{i=1}^{N} w_{iL} \cdot x_i \qquad (14)$$

where $A_L$ represents the low-order accumulation value; $w_{iL}$ represents a value from the least significant digit to the digit one digit lower than the stop digit in the coefficient of the index (i). For example, when the coefficient is binary data and the stop digit is "9", $w_{iL}$ is 8-bit data representing the values from the least significant bit to the eighth bit in $w_1$.

Here, the low-order multiplier 54 calculates a low-order multiplication value by a circuit that executes the same expression as the expression calculated by the high-order multiplier 50. That is, the low-order multiplier 54 realizes the calculation of ($w_{iL} \cdot x_i$) presented in Equation (14) by a circuit that executes the same expression as the expression in which the high-order multiplier 50 calculates a high-order multiplication value.

For example, when the high-order multiplier 50 calculates the high-order multiplication value by a circuit that executes a first operation expression, the low-order multiplier 54 calculates a low-order multiplication value by the circuit that executes the first operation expression. Furthermore, for example, when the high-order multiplier 50 calculates the high-order multiplication value by a circuit that executes a second operation expression, the low-order multiplier 54 calculates a low-order multiplication value by the circuit that executes the second operation expression. Thereby, the low-order multiplier 54 can match the high-order multiplication value and the low-order multiplication value.

Note that, for example, the low-order multiplier 54 starts processing after the processing of the high-order multiplier 50 is completed. Furthermore, the low-order multiplier 54 may execute processing in parallel with the processing of the high-order multiplier 50. For example, the low-order multiplier 54 starts processing when a predetermined digit is designated as the target digit.

The comparator 58 determines whether or not the high-order accumulation value has exceeded a preset boundary value. The boundary value is a value indicating the boundary between the transient region and the saturation region in the intermediate value (multiplication accumulation value). The "exceeding" means that the high-order accumulation value has changed from the transient region to the saturation region. As a result, the comparator 58 can detect that the high-order accumulation value has changed from the transient region to the saturation region.

For example, in a case where the high-order multiplier 50 calculates the high-order multiplication value by the circuit that executes the first operation expression, the comparator 58 determines whether or not the high-order accumulation value is larger than a preset first boundary value. The first boundary value is a value indicating the boundary between the transient region and the positive-side saturation region in the intermediate value (multiplication accumulation value). As a result, the comparator 58 can detect that the high-order accumulation value has changed from the transient region to the positive-side saturation region.

Furthermore, for example, in a case where the high-order multiplier 50 calculates the high-order multiplication value by the circuit that executes the second operation expression, the comparator 58 determines whether or not the high-order accumulation value is smaller than a preset second boundary value. The second boundary value is a value indicating the boundary between the transient region and the negative-side saturation region in the intermediate value (multiplication accumulation value). As a result, the comparator 58 can detect that the high-order accumulation value has changed from the transient region to the negative-side saturation region.

When the high-order accumulation value exceeds a boundary value, the comparator 58 notifies the output unit 60 that the high-order accumulation value exceeds the boundary value. In addition, the comparator 58 receives a notification from the controller 46 that the stop digit has been designated as the target digit. Even if the comparator 58 designates the stop digit as the target digit and calculates all the high-order multiplication values of the N input values, if the high-order accumulation value does not exceed the boundary value, the comparator 58 notifies the output unit 60 that the high-order accumulation value does not exceed the boundary value.

When the high-order accumulation value exceeds the preset boundary value, the output unit 60 outputs the value in the range after passing the boundary value as the multiplication accumulation value. For example, in a case where the high-order multiplier 50 calculates the high-order multiplication value by the circuit that executes the first operation expression, the output unit 60 may output an arbitrary value larger than the first boundary value as a multiplication accumulation value. Furthermore, for example, in a case where the high-order multiplier 50 calculates the high-order multiplication value by the circuit that executes the second operation expression, the output unit 60 may output an arbitrary value smaller than the second boundary value as a multiplication accumulation value.

For example, when the high-order accumulation value exceeds the boundary value, the output unit 60 may output the high-order accumulation value at the time when the output value exceeds the boundary value as the multiplication accumulation value. That is, the output unit 60 may output a value output from the high-order accumulator 52 at the time when it is determined that the high-order accumulation value has exceeded the boundary value, as the multiplication accumulation value.

Note that when the high-order accumulation value exceeds the boundary value, the comparator 58 notifies the controller 46 that the high-order accumulation value exceeds the boundary value. When the high-order accumulation value exceeds the boundary value, the controller 46 stops the multiplication processing by the high-order multiplier 50 and the low-order multiplier 54. As a result, the controller 46 can eliminate unnecessary multiplication processing after the output unit 60 outputs the accumulation multiplication value.

Even when the comparator 58 designates the stop digit as the target digit and calculates the high-order multiplication value, the output unit 60 receives notification that the high-order accumulation value does not exceed the boundary value. Even if the output unit 60 designates the stop digit as the target digit and calculates all the high-order multiplication values of the N input values, if the high-order accumulation value does not exceed the boundary value, the output unit 60 outputs a value obtained by adding the low-order accumulation value to the high-order accumulation value as a multiplication accumulation value.

For example, even if the output unit 60 designates the stop digit as the target digit and calculates all the high-order multiplication values of the N input values, if the high-order accumulation value is not larger than the first boundary value, the output unit 60 outputs a value obtained by adding the low-order accumulation value to the high-order accumulation value as a multiplication accumulation value. Further, for example, even if the output unit 60 designates the stop digit as the target digit and calculates all the high-order multiplication values of the N input values, if the high-order accumulation value is not smaller than the second boundary value, the output unit 60 outputs a value obtained by adding the low-order accumulation value to the high-order accumulation value as a multiplication accumulation value.

The sum-of-products calculator 20 outputs the multiplication accumulation value output from the output unit 60 to the activation function circuit 30 as an intermediate value.

FIG. 4 is a view illustrating an image of coefficients stored in the coefficient storage 44. The coefficient storage 44 stores N coefficients ($w_1, w_2, w_3, \ldots, w_N$).

Let the coefficients be represented in 2's complement with a bit width of 19 digits and the stop digit (s) in position 7, counting from the least significant digit (LSB). In such a case, the first memory 62 stores bit values (k=0 to 12) from the seventh digit to the 19th digit (MSB) for each of the N coefficients. Further, the first memory 62 can read the bit values from the seventh digit to the 19th digit (MSB) in the coefficient on a unit of digit.

In addition, the second memory 64 stores values of six bits from the first digit (LSB) to the sixth digit for each of the N coefficients. For example, each of the N coefficients can be read out in unit of 6 bits in the second memory 64.

The first memory 62 and the second memory 64 may be circuits to which different power supply voltages are applied. For example, a lower power supply voltage than the first memory 62 is applied to the second memory 64. As a result, the sum-of-products calculator 20 can execute multiplication processing on the digits lower than the stop digit (s) in the coefficient with low power.

Also, the second memory 64 may have a higher read error rate than the first memory 62. For example, the second memory 64 may have a simpler configuration or lower reliability than the first memory 62. As a result, the sum-of-products calculator 20 can execute multiplication processing on the digits lower than the stop digit (s) in the coefficient at low cost and at high speed.

Figure 5:
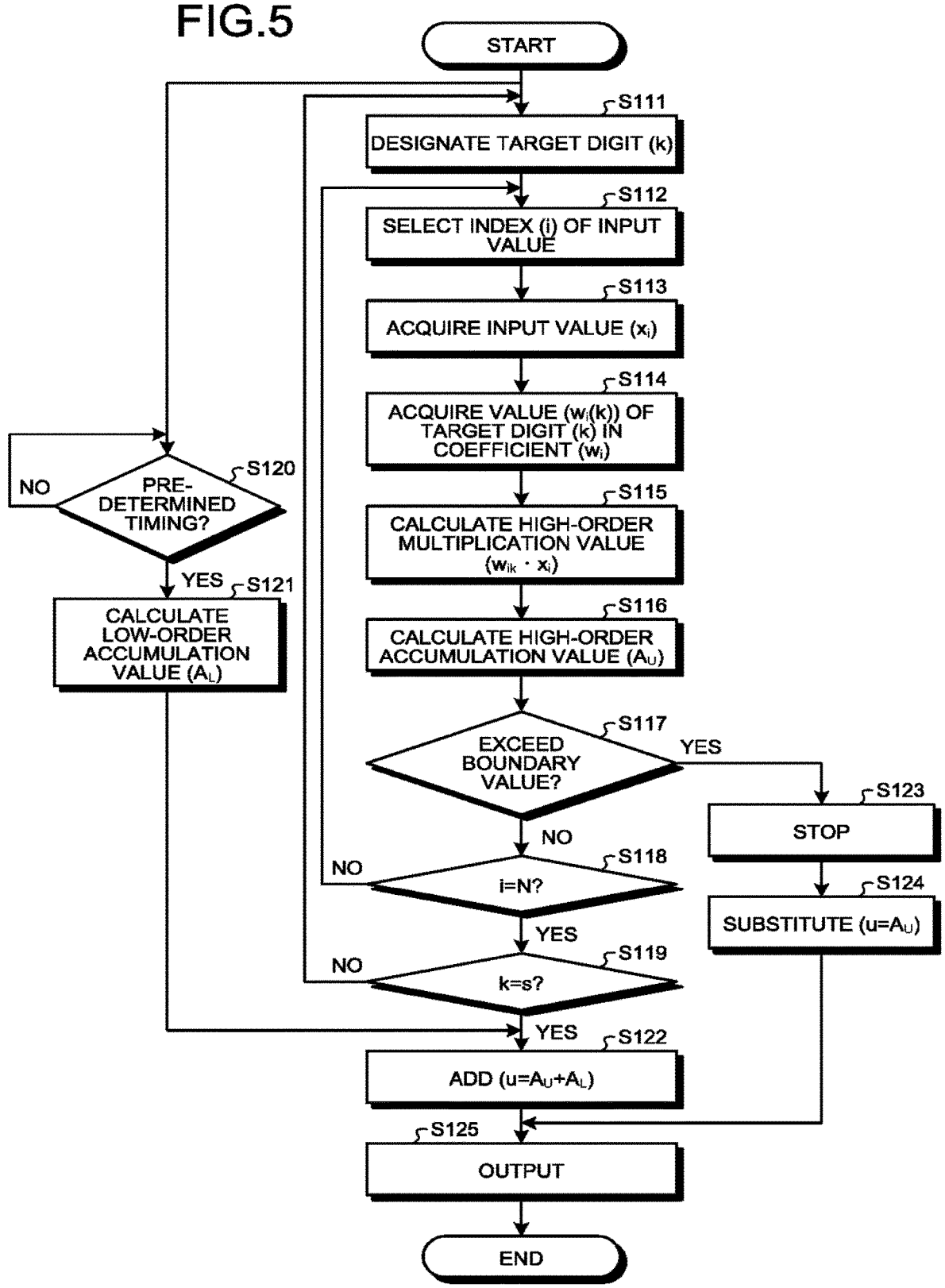
FIG. 5 is a flowchart illustrating processing of a sum-of-products calculator.

FIG. 5 is a flowchart illustrating processing of the sum-of-products calculator 20. When executing operation processing, the sum-of-products calculator 20 executes processing in accordance with the flow of FIG. 5.

First, in S111, the controller 46 designates the target digit (k). For example, the controller 46 designates integers from 0 to s in ascending order as the target digit (k).

Subsequently, in S112, the high-order multiplier 50 selects an index (i). For example, the high-order multiplier 50 selects integers 1 to N in ascending order as the index (i).

Subsequently, in S113, the high-order multiplier 50 acquires an input value ($x_i$) corresponding to the selected index (i). Subsequently, in S114, the high-order multiplier 50 acquires a value ($w_i(k)$) of the target digit (k) in the coefficient ($w_i$) corresponding to the selected index (i). Subsequently, in S115, the high-order multiplier 50 calculates a high-order multiplication value ($w_i(k) \cdot x_i$). Subsequently, in S116, the high-order accumulator 52 accumulates the high-order multiplication value ($w_i(k) \cdot x_i$). That is, the high-order accumulator 52 adds the high-order multiplication value ($w_i(k) \cdot x_i$) calculated in S115 to the high-order accumulation value ($A_U$) before calculation and updates the high-order accumulation value ($A_U$). Note that the high-order accumulation value ($A_U$) is initialized to 0 at the start of the flow.

Subsequently, in S117, the comparator 58 determines whether or not the high-order accumulation value ($A_U$) has exceeded the boundary value. For example, when the high-order multiplication value ($w_i(k) \cdot x_i$) is calculated by the first operation expression, the comparator 58 determines whether or not the high-order accumulation value ($A_U$) is larger than the first boundary value. Furthermore, for example, when the high-order multiplication value ($w_i(k) \cdot x_i$) is calculated by the second operation expression, the comparator 58 determines whether or not the high-order accumulation value ($A_U$) is smaller than the second boundary value.

When the high-order accumulation value ($A_U$) does not exceed the boundary value (No in S117), the comparator 58 advances the processing to S118.

In S118, the high-order multiplier 50 determines whether the index (i) is N or not. That is, the high-order multiplier 50 determines whether or not all N input values have been selected. When the index (i) is not N (No in S118), the high-order multiplier 50 returns the processing to S112. Upon returning the processing to S112, the high-order multiplier 50 selects the next value as the index (i) in S112, and repeats the subsequent processing. When the index (i) is N (Yes in S118), the high-order multiplier 50 advances the processing to S119.

In S119, the controller 46 determines whether or not the target digit (k) is a stop digit (s). That is, the controller 46 determines whether or not all the target digits (k) have been designated from the most significant digit to the stop digit (s). When the target digit (k) is not the stop digit (s) (No in S119), the controller 46 returns the processing to S111. Upon returning the processing to S111, the controller 46 designates a new target digit (k) in S111 and repeats the subsequent processes. When the target digit (k) is the stop digit (s) (Yes in S119), the controller 46 advances the processing to S122.

On the other hand, the sum-of-products calculator 20 executes the processing in S120 and S121 in parallel with the loop processing between S111 and S119. In step S120, after starting the flow, the controller 46 determines whether or not the predetermined timing is reached. When the predetermined timing is reached (Yes in S120), the controller 46 gives an instruction to start operation to the low-order multiplier 54, and advances the processing to S121.

For example, when the target digit (k) is designated up to the stop digit (s) and the value of the index (i) is N, the controller 46 may determine that the predetermined timing is reached. Further, the controller 46 may determine that the predetermined timing is reached immediately after the start of the flow. Further, the controller 46 may determine that the predetermined timing is reached when the target digit (k) is a predetermined digit before the stop digit (s). The controller 46 waits for processing until a predetermined timing is reached (No in S120).

In S121, the low-order multiplier 54 and the low-order accumulator 56 calculate the low-order accumulation value $(A_L)$. After calculating the low-order accumulation value $(A_L)$, the low-order multiplier 54 and the low-order accumulator 56 advance the processing to S122. Note that details of the processing in S121 will be described with reference to FIG. 6.

In S119, when it is determined that the target digit (k) is the stop digit (s) (Yes in S119) and the calculation of the low-order accumulation value $(A_L)$ is completed in S121, the output unit 60 executes the processing in S122. In S122, the output unit 60 adds the high-order accumulation value $(A_U)$ and the low-order accumulation value $(A_L)$ to calculate an intermediate value (u) that is a multiplication accumulation value. Upon completion of the processing in S122, the output unit 60 advances the processing to S125.

Also, if the high-order accumulation value $(A_U)$ exceeds the boundary value within the loop processing between S111 and S119 (Yes in S117), the comparator 58 advances the processing to S123.

In S123, the controller 46 stops the processing by the high-order multiplier 50 and the processing by the low-order multiplier 54. Subsequently, in S124, the output unit 60 substitutes the high-order accumulation value $(A_U)$ into the intermediate value (u) which is the multiplication accumulation value. Upon completion of the processing in S124, the output unit 60 advances the processing to S125.

Then, in S125, the output unit 60 outputs the intermediate value (u) to the activation function circuit 30 in the subsequent stage.

Figure 6:
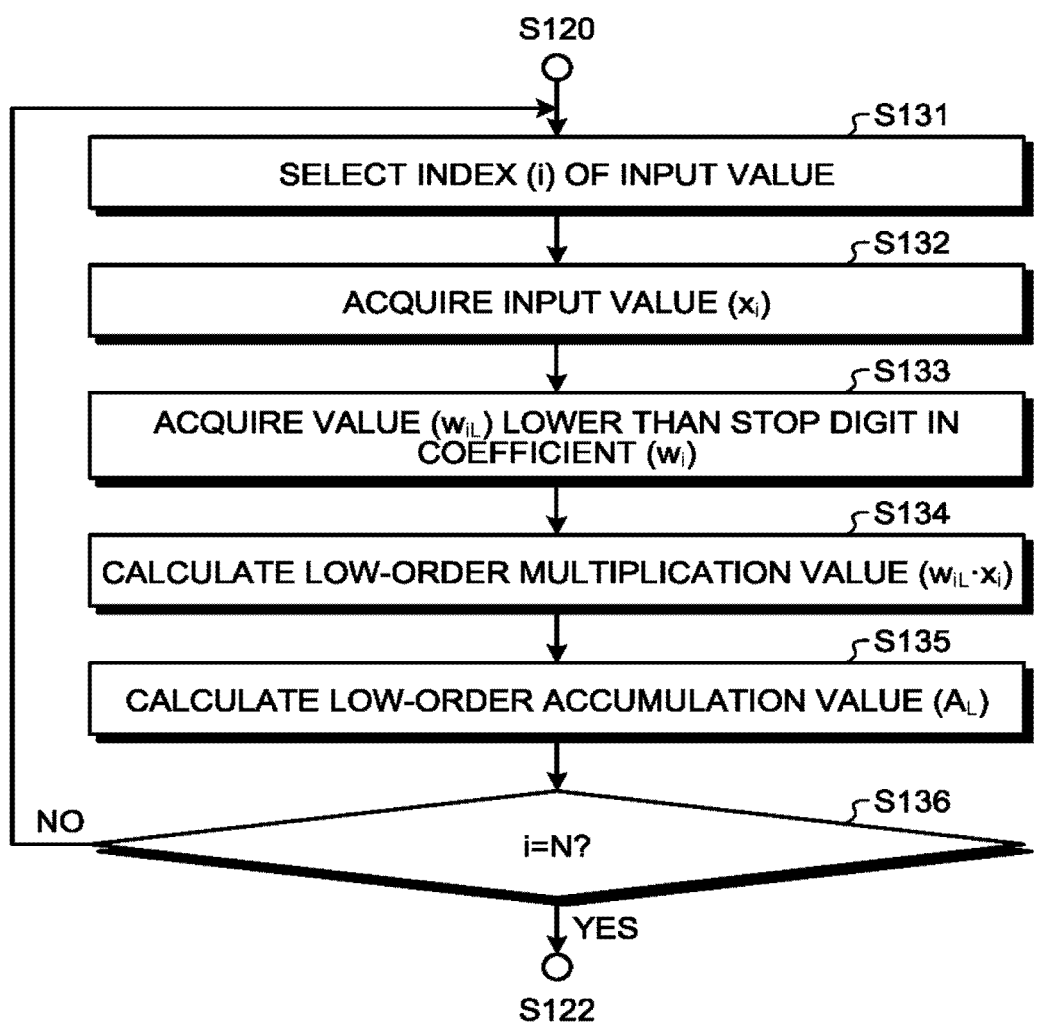
FIG. 6 is a flowchart illustrating calculation processing of a low-order accumulation value of a sum-of-products calculator.

FIG. 6 is a flowchart illustrating calculation processing of a low-order accumulation value of the sum-of-products calculator 20. When it is determined that the predetermined timing is reached in S120, the low-order multiplier 54 and low-order accumulator 56 execute the processing in S131 to S136 illustrated in FIG. 6.

In step S131, the low-order multiplier 54 selects the index (i). For example, the low-order multiplier 54 selects integers 1 to N as the index (i) one by one in ascending order.

Subsequently, in S132, the low-order multiplier 54 acquires the input value $(x_i)$ corresponding to the selected index (i). Subsequently, in S133, the low-order multiplier 54 acquires a value $(w_{iL})$ lower than the stop digit in the coefficient $(w_i)$ corresponding to the selected index (i).

Subsequently, in S134, the low-order multiplier 54 calculates the low-order multiplication value $(w_{iL} \cdot x_i)$. Subsequently, in S135, the low-order accumulator 56 accumulates the low-order multiplication value $(w_{iL} \cdot x_i)$. That is, the low-order accumulator 56 updates the low-order accumulation value $(A_L)$ by adding the low-order multiplication value $(w_{iL} \cdot x_i)$ calculated in S134 to the low-order accumulation value $(A_L)$ before calculation. Note that the low-order accumulation value $(A_L)$ is initialized to 0 before the flow starts.

In S136, the low-order multiplier 54 determines whether the index (i) is N or not. That is, the low-order multiplier 54 determines whether or not all the N input values have been selected. When the index (i) is not N (No in S136), the low-order multiplier 54 returns the processing to S131. Upon returning the processing to S131, the low-order multiplier 54 selects the next value as the index (i) in S131 and repeats the subsequent processing. When the index (i) is N (Yes in S136), the low-order multiplier 54 advances the processing to S122.

Figure 7:
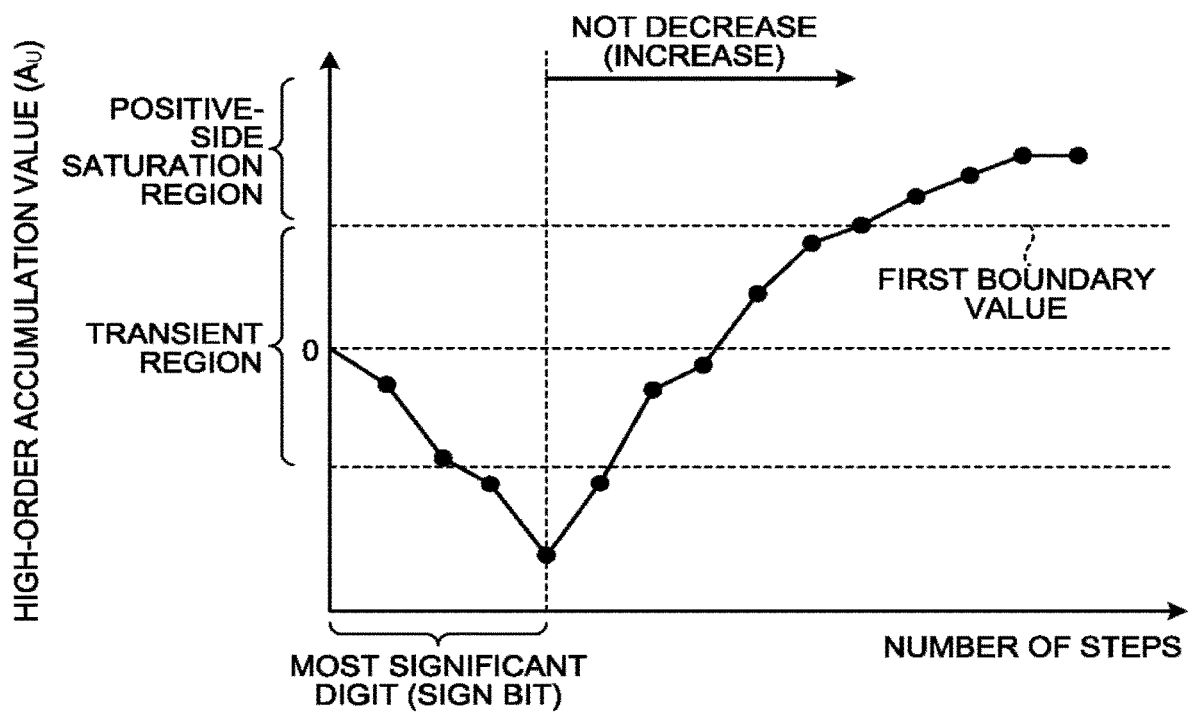
FIG. 7 is a diagram illustrating an example of a transition of a high-order accumulation value according to a first operation expression.

FIG. 7 is a diagram illustrating an example of a transition of a high-order accumulation value $(A_U)$ according to the first operation expression. The high-order multiplier 50 realizes the calculation of $(w_{ik} \cdot x_i)$ by, for example, a circuit that executes the first operation expression. Here, $(w_{ik} \cdot x_i)$ is an operation that multiplies the input value $(x_i)$ of the index (i) by the value of the target digit (k) in the coefficient $(w_i)$ of the index (i) by the weight of the target digit (k). Further, in this case, the low-order multiplier 54 also realizes the calculation of $(w_{iL} \cdot x_i)$ by the circuit that executes the first operation expression. Here, $(w_{iL} \cdot x_i)$ is an operation of multiplying the input value $(x_i)$ of the index (i) by the value lower than the stop digit (s) of the coefficient $(w_i)$ of the index (i).

The first operation expression is an operation in which the result of multiplication of the value of the lower digit from the most significant digit (that is, the value of each digit from the least significant digit to the digit one digit lower than the most significant digit) by the corresponding input value is 0 or positive. Specifically, when the input value $(x_1)$ and the coefficient $(w_i)$ are binary numbers represented by 2's complement, the first operation expression is as presented in Equation (21).

$$w_i \cdot x_i = \begin{cases} \left[ -2^m \cdot w_i(0) + \sum_{k=1}^{m} 2^{m-k} \cdot w_i(k) \right] \cdot |x_i| & (x_i \geq 0) \\ \left[ -2^m \cdot \overline{w_i(0)} + 1 + \sum_{k=1}^{m} 2^{m-k} \cdot \overline{w_i(k)} \right] \cdot |x_i| & (x_i < 0) \end{cases} \quad (21)$$

Note that the overline being written above the terms indicates bit inversion. Here, m is a value obtained by subtracting 1 from the number of digits (bit width) of the coefficient $(w_i)$; $|x_i|$ represents the absolute value of $x_i$, in other words, $|x_i|$ represents a value excluding the sign (the most significant digit) of $x_i$.

When the target digit (k) is the most significant digit (k=0), the high-order multiplier 50 realized by the circuit that executes the first operation expression executes the calculation of the following Equation (22).

$$w_{ik} \cdot x_i = \begin{cases} -2^m \cdot w_i(0) \cdot |x_i| & (x_i \geq 0) \\ -(2^m \cdot \overline{w_i(0)} \cdot |x_i|) + |x_i| & (x_i < 0) \end{cases} \quad (22)$$

When the target digit (k) is a digit lower than the most significant digit (k=1 to s), the high-order multiplier 50 realized by the circuit that executes the first operation expression executes the calculation of the following Equation (23).

$$w_{ik} \cdot x_i = \begin{cases} 2^{m-k} \cdot w_i(k) \cdot |x_i| & (x_i \geq 0) \\ 2^{m-k} \cdot \overline{w_i(k)} \cdot |x_i| & (x_i < 0) \end{cases} \quad (23)$$

The low-order multiplier 54 realized by the circuit that executes the first operation expression executes the following Equation (24).

$$w_{iL} \cdot x_i = \begin{cases} w_{iL} \cdot |x_i| & (x_i \geq 0) \\ \overline{w_{iL}} \cdot |x_i| & (x_i < 0) \end{cases} \quad (24)$$

Here, when the high-order multiplier 50 realized by the circuit that executes the first operation expression executes the operation of ($w_{ik} \cdot x_i$) one digit from the most significant digit toward the lower digit, the high-order accumulation value ($A_U$) transitions as illustrated in FIG. 7. That is, after the operation in which the most significant digit (sign digit) is designated as the target digit is completed, the high-order accumulation value ($A_U$) does not decrease even when the accumulation processing step advances.

Therefore, when the high-order accumulation value ($A_U$) is larger than the first boundary value between the transition region and the positive-side saturation region, even if the accumulation processing step advances thereafter, the high-order accumulation value ($A_U$) does not return to the transient region. That is, when the high-order accumulation value ($A_U$) is larger than the first boundary value in the course of the accumulation processing, the final high-order accumulation value ($A_U$) becomes the value of the positive-side saturation region.

The intermediate value calculated by the sum-of-products calculator 20 is given to the activation function circuit 30. In the activation function circuit 30, the intermediate value in the positive-side saturation region has little influence on the accuracy of the output value. Therefore, when the high-order accumulation value ($A_U$) is larger than the first boundary value, the sum-of-products calculator 20 ends the processing midway and outputs the high-order accumulation value ($A_U$) with relatively poor precision. As a result, in the sum-of-products calculator 20, when the intermediate value is the positive-side saturation region, it is possible to achieve high-speed processing and low power consumption.

On the other hand, if the high-order accumulation value ($A_U$) is not larger than the first boundary value, the final high-order accumulation value ($A_U$) may be included in the transient region. In the activation function circuit 30, the intermediate value in the transient region has a large influence on the accuracy of the output value. Therefore, when the target digit (k) reaches the stop digit (s) without the high-order accumulation value ($A_U$) being larger than the first boundary value, the sum-of-products calculator 20 ends the processing until the end and outputs an accurate intermediate value obtained by adding the high-order accumulation value ($A_U$) and the low-order accumulation value ($A_L$). Thus, in the sum-of-products calculator 20, when there is a possibility that the intermediate value is included in the transient region, the activation function circuit 30 can output an accurate output value.

Figure 8:
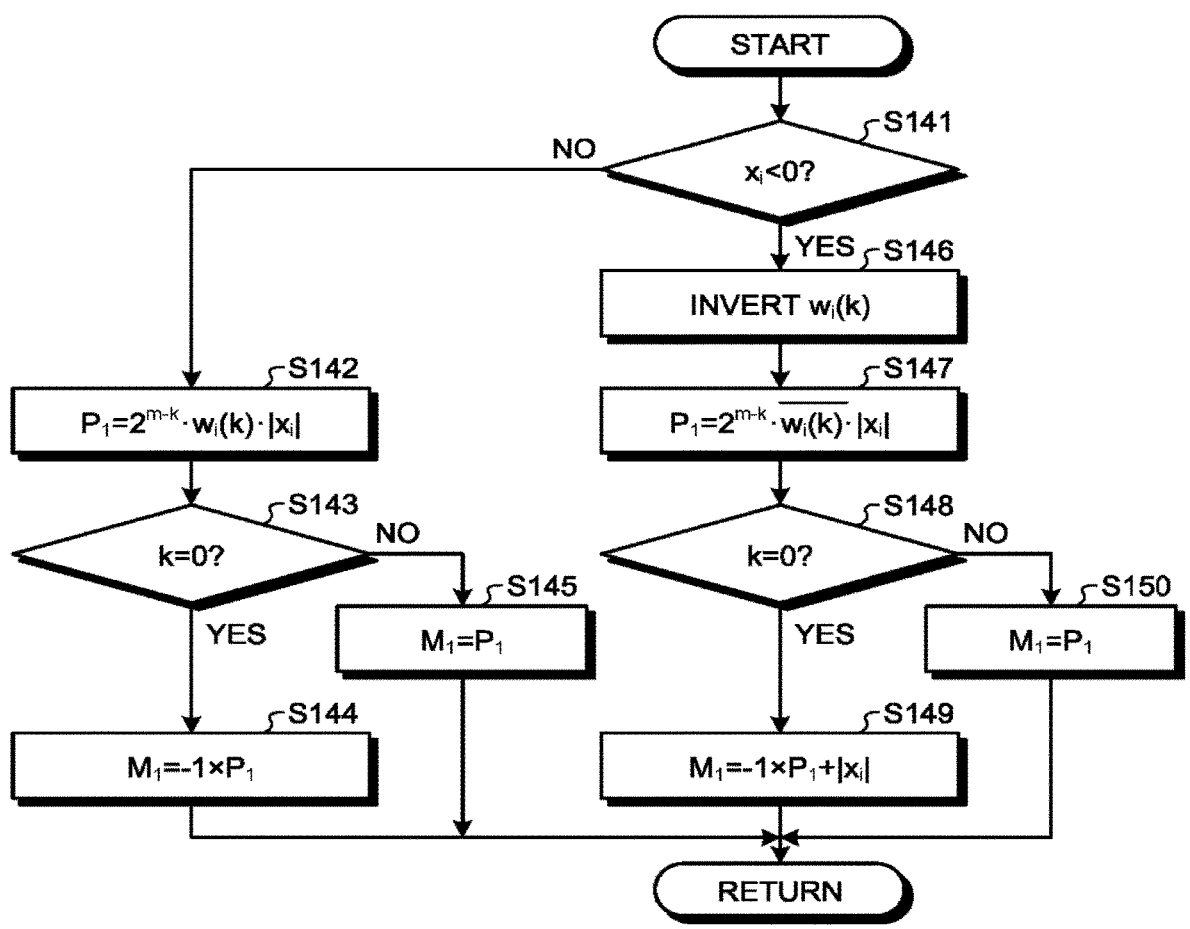
FIG. 8 is a flowchart illustrating processing of a high-order multiplier that executes the first operation expression.

FIG. 8 is a flowchart illustrating the processing of the high-order multiplier 50 realized by the circuit that executes the first operation expression. The high-order multiplier 50 realized by the circuit that executes the first operation expression executes processing according to the flowchart illustrated in FIG. 8, for example.

First, in S141, the high-order multiplier 50 determines whether or not the input value ($x_i$) is negative. When the input value ($x_i$) is not negative (No in S141), the high-order multiplier 50 advances the processing to S142. In S142, the high-order multiplier 50 calculates $P_1$ according to the following Equation (25).

$$P_1 = 2^{m-k} \cdot w_i(k) \cdot |x_i| \quad (25)$$

Subsequently, in S143, the high-order multiplier 50 determines whether k is 0 or not. In a case where k is 0 (Yes in S143), in S144, the high-order multiplier 50 multiplies $P_1$ calculated by Equation (25) by −1 to calculate a first high-order multiplication value ($M_1$). In a case where k is not 0 (No in S143), in S145, the high-order multiplier 50 sets $P_1$ calculated by Equation (25) as a first high-order multiplication value ($M_1$). Upon completion of the processing in S144 or S145, the high-order multiplier 50 ends the calculation of ($w_i(k) \cdot x_i$).

Also, when the input value ($x_i$) is negative (Yes in S141), the high-order multiplier 50 advances the processing to S146. In S146, the high-order multiplier 50 bit-inverts the value ($w_i(k)$) of the target digit (k) in the coefficient ($w_i$). Subsequently, in S147, the high-order multiplier 50 calculates $P_1$ according to the following Equation (26).

$$P_1 = 2^{m-k} \cdot \overline{w_i(k)} \cdot |x_i| \quad (26)$$

Subsequently, in S148, the high-order multiplier 50 determines whether k is 0 or not. When k is 0 (Yes in S148), in S149, the high-order multiplier 50 multiplies $P_1$ calculated by Equation (26) by −1, adds the absolute value ($|x_1|$) of the input value ($x_1$) to ($−1 \times P_1$), and thus calculates the first high-order multiplication value ($M_1$). In a case where k is not 0 (No in S148), in S150, the high-order multiplier 50 sets $P_1$ calculated by Equation (26) as a first high-order multiplication value ($M_1$). Upon completion of the processing in S149 or S150, the high-order multiplier 50 ends the calculation of ($w_i(k) \cdot x_i$).

Figure 9:
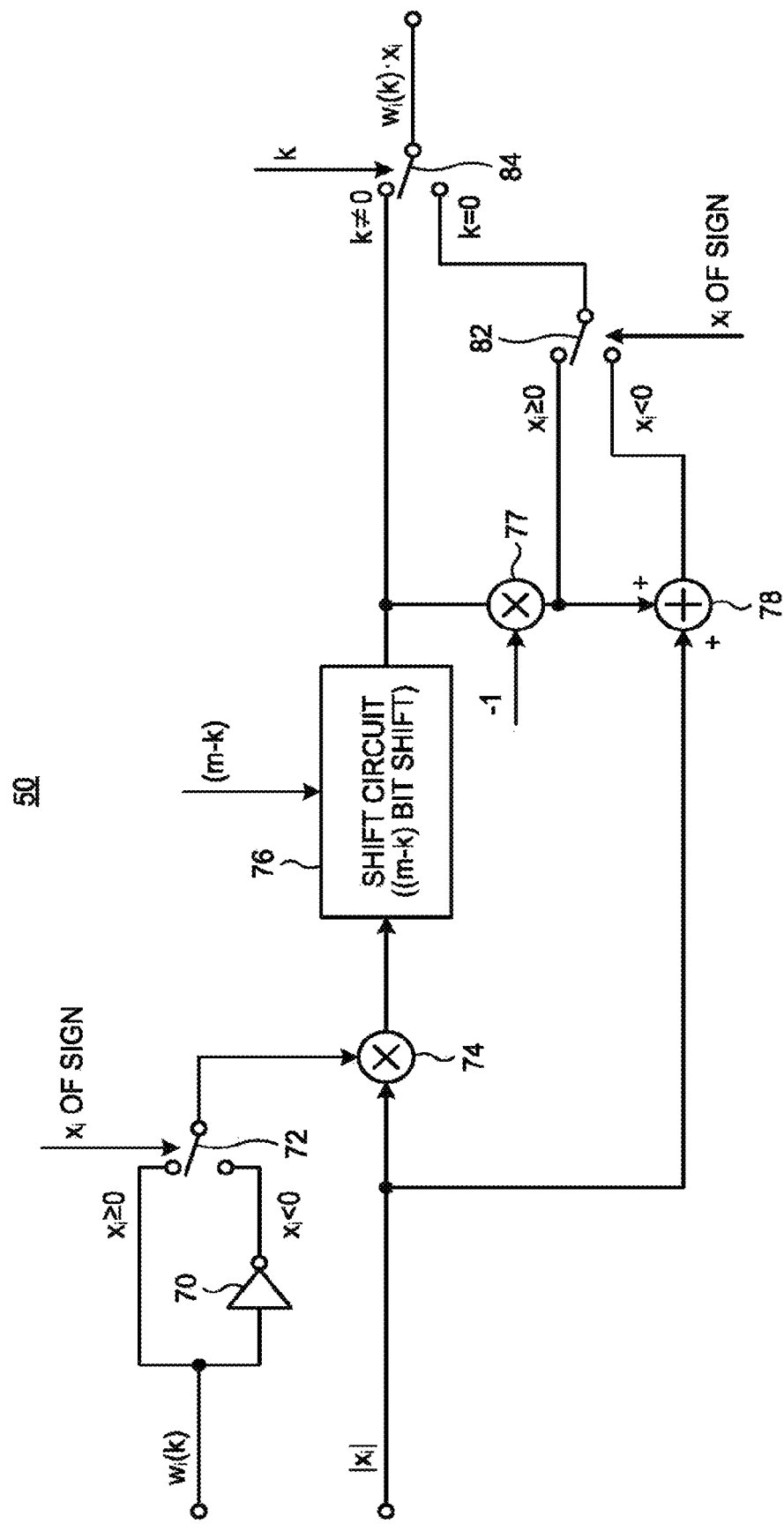
FIG. 9 is a configuration diagram of a high-order multiplier that executes the first operation expression.

FIG. 9 is a diagram illustrating the configuration of the high-order multiplier 50 realized by the circuit that executes the first operation expression. The high-order multiplier 50 realized by the circuit that executes the first operation expression has the configuration illustrated in FIG. 9, for example.

The high-order multiplier 50 includes an inverter 70, a first switch 72, a first multiplier 74, a shift circuit 76, a second multiplier 77, an adder 78, a second switch 82, and a third switch 84.

The inverter 70 bit-inverts the value ($w_i(k)$) of the target digit (k) in the coefficient ($w_i$). The first switch 72 selects and outputs the value ($w_i(k)$) of the target digit (k) in the coefficient ($w_i$) when the input value ($x_i$) is 0 or more. When the input value ($x_i$) is smaller than 0, the first switch 72 selects and outputs the output value of the inverter 70.

The first multiplier 74 multiplies the absolute value ($|x_i|$) of the input value ($x_i$) by the output value of the first switch 72. The shift circuit 76 left-bit-shifts the output value of the first multiplier 74 by (m−k) bits.

The second multiplier 77 multiplies the output value of the shift circuit 76 by −1. The adder 78 adds the output value of the second multiplier 77 and the absolute value ($|x_i|$) of the input value ($x_i$).

The second switch 82 selects and outputs the output value of the second multiplier 77 when the input value ($x_i$) is 0 or more. The second switch 82 selects and outputs the output value of the adder 78 when the input value ($x_i$) is smaller than 0.

The third switch 84 selects and outputs the output value of the shift circuit 76 when the target digit (k) is not 0. When the target digit (k) is 0, the third switch 84 selects and outputs the output value of the second switch 82. Then, the high-order multiplier 50 outputs the output value of the third switch 84 as ($w_i(k) \cdot x_i$).

Figure 10:
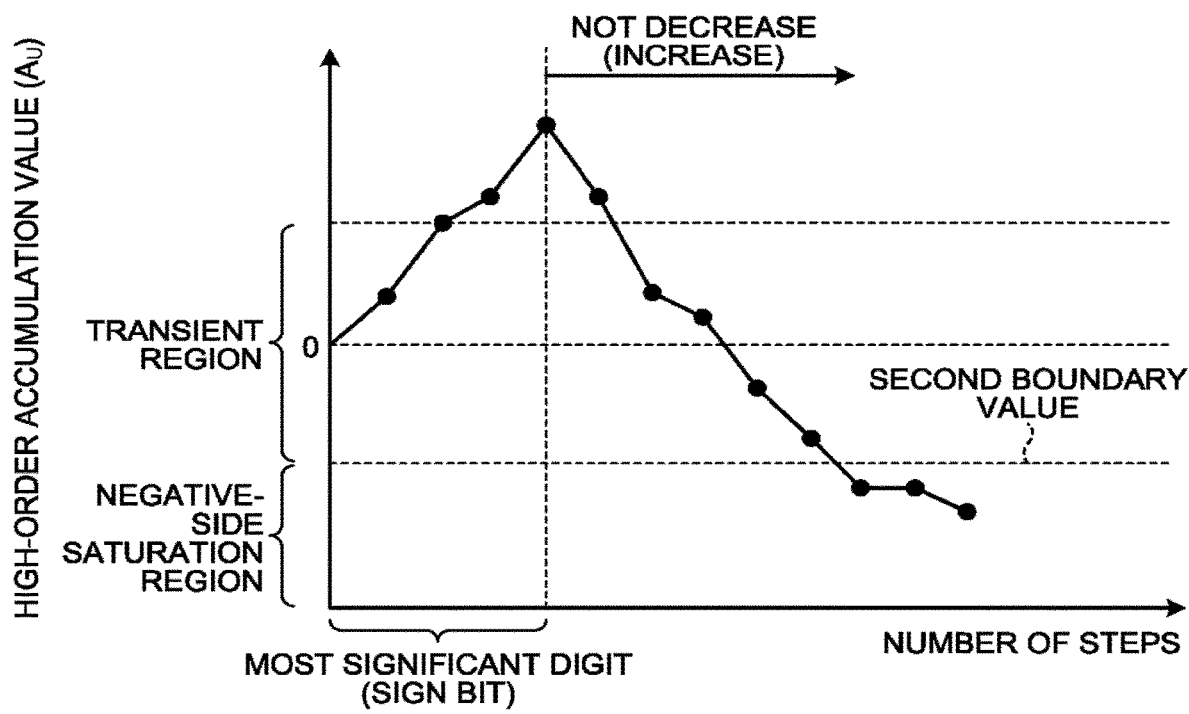
FIG. 10 is a diagram illustrating an example of a transition of a high-order accumulation value by a second operation expression.

FIG. 10 is a diagram illustrating an example of a transition of a high-order accumulation value ($A_U$) according to the second operation expression. The high-order multiplier 50 realizes the calculation of ($w_{iк} \cdot x_i$) by, for example, a circuit that executes the second operation expression. Further, in this case, the low-order multiplier 54 also realizes the calculation of ($w_{iL} \cdot x_i$) by the circuit that executes the second operation expression.

The second operation expression is an operation in which the result of multiplication of the value of the lower digit from the most significant digit (that is, the value of each digit from the least significant digit to the digit one digit lower than the most significant digit) by the corresponding input value is 0 or negative. Specifically, when the input value ($x_i$) and the coefficient ($w_i$) are binary numbers represented by 2's complement, the second operation expression is as presented in Equation (31).

$$w_i \cdot x_i = \begin{cases} \left[ 2^m \cdot \overline{w_i(0)} - 1 - \sum_{k=1}^{m} 2^{m-k} \cdot \overline{w_i(k)} \right] \cdot |x_i| & (x_i \geq 0) \\ \left[ 2^m \cdot w_i(0) - \sum_{k=1}^{m} 2^{m-k} \cdot w_i(k) \right] \cdot |x_i| & (x_i < 0) \end{cases} \quad (31)$$

When the target digit (k) is the most significant digit (k=0), the high-order multiplier 50 realized by the circuit that executes the second operation expression executes the calculation of the following Equation (32).

$$w_{ik} \cdot x_i = \begin{cases} (2^m \cdot \overline{w_i(0)} \cdot |x_i|) - |x_i| & (x_i \geq 0) \\ 2^m \cdot w_i(0) \cdot |x_i| & (x_i < 0) \end{cases} \quad (32)$$

When the target digit (k) is a digit lower than the most significant digit (k=1 to s), the high-order multiplier 50 realized by the circuit that executes the second operation expression executes the calculation of the following Equation (33).

$$w_{ik} \cdot x_i = \begin{cases} -2^{m-k} \cdot \overline{w_i(k)} \cdot |x_i| & (x_i \geq 0) \\ -2^{m-k} \cdot w_i(k) \cdot |x_i| & (x_i < 0) \end{cases} \quad (33)$$

The low-order multiplier 54 realized by the circuit that executes the second operation expression executes the following Equation (34).

$$w_{iL} \cdot x_i = \begin{cases} \overline{w_{iL}} \cdot |x_i| & (x_i \geq 0) \\ w_{iL} \cdot |x_i| & (x_i < 0) \end{cases} \quad (34)$$

Here, when the high-order multiplier 50 realized by the circuit that executes the second operation expression executes the operation of ($w_{ik} \cdot x_i$) one digit from the most significant digit toward the lower digit, the high-order accumulation value ($A_U$) transitions as illustrated in FIG. 10. That is, after the operation in which the most significant digit (sign digit) is designated as the target digit is completed, the high-order accumulation value ($A_U$) does not increase even when the accumulation processing step advances.

Therefore, when the high-order accumulation value ($A_U$) is smaller than the second boundary value between the transition region and the negative-side saturation region, even if the accumulation processing step advances thereafter, the high-order accumulation value ($A_U$) does not return to the transient region. That is, when the high-order accumulation value ($A_U$) is smaller than the second boundary value in the course of the accumulation processing, the final high-order accumulation value ($A_U$) becomes the value of the negative-side saturation region.

The intermediate value calculated by the sum-of-products calculator 20 is given to the activation function circuit 30. In the activation function circuit 30, the intermediate value in the negative-side saturation region has little influence on the accuracy of the output value. Therefore, when the high-order accumulation value ($A_U$) is smaller than the second boundary value, the sum-of-products calculator 20 ends the processing midway and outputs the high-order accumulation value ($A_U$) with relatively poor precision. As a result, in the sum-of-products calculator 20, when the intermediate value is the negative-side saturation region, it is possible to achieve high-speed processing and low power consumption.

On the other hand, if the high-order accumulation value ($A_U$) is not smaller than the second boundary value, the final high-order accumulation value ($A_U$) may be included in the transient region. In the activation function circuit 30, the intermediate value in the transient region has a large influence on the accuracy of the output value. Therefore, when the target digit (k) reaches the stop digit (s) without the high-order accumulation value ($A_U$) being smaller than the second boundary value, the sum-of-products calculator 20 ends the processing until the end and outputs an accurate intermediate value obtained by adding the high-order accumulation value ($A_U$) and the low-order accumulation value ($A_L$). Thus, in the sum-of-products calculator 20, when there is a possibility that the intermediate value is included in the transient region, the activation function circuit 30 can output an accurate output value.

Figure 11:
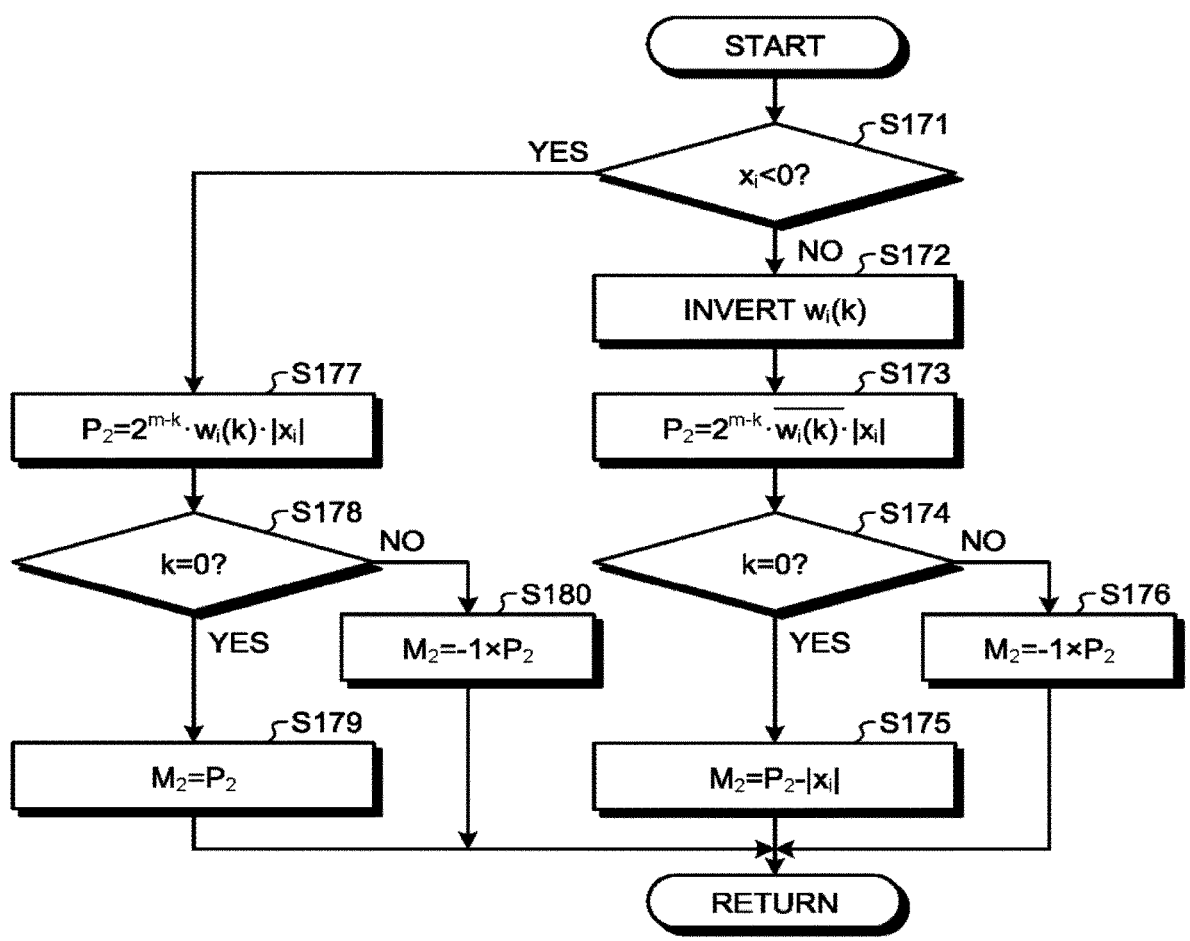
FIG. 11 is a flowchart illustrating processing of a high-order multiplier that executes the second operation expression.

FIG. 11 is a flowchart illustrating the processing of the high-order multiplier 50 realized by the circuit that executes the second operation expression. The high-order multiplier 50 realized by the circuit that executes the second operation expression executes processing according to the flowchart illustrated in FIG. 11, for example.

First, in S171, the high-order multiplier 50 determines whether or not the input value ($x_i$) is negative. When the input value ($x_i$) is not negative (No in S171), the high-order multiplier 50 advances the processing to S172. In S172, the high-order multiplier 50 bit-inverts the value ($w_i(k)$) of the target digit (k) in the coefficient ($w_i$). Subsequently, in S173, the high-order multiplier 50 calculates $P_2$ according to the following Equation (35).

$$P_2 = 2^{m-k} \cdot \overline{w_i(k)} \cdot |x_i| \quad (35)$$

Subsequently, in S174, the high-order multiplier 50 determines whether k is 0 or not. In a case where k is 0 (Yes in S174), in S175, the high-order multiplier 50 subtracts the absolute value ($|x_i|$) of the input value from $P_2$ calculated by Equation (35) to calculate a second high-order multiplication value ($M_2$). In a case where k is not 0 (No in S174), in S176, the high-order multiplier 50 multiplies $P_2$ calculated by Equation (35) by −1 and sets (−1×$P_2$) as the second high-order multiplication value ($M_2$). Upon completion of the processing in S175 or S176, the high-order multiplier 50 ends the calculation of ($w_i(k) \cdot x_i$).

Also, when the input value ($x_i$) is negative (Yes in S171), the high-order multiplier 50 advances the processing to S177. Subsequently, in S177, the high-order multiplier 50 calculates $P_2$ according to the following Equation (36).

$$P_2 = 2^{m-k} \cdot w_i(k) \cdot |x_i| \tag{36}$$

Subsequently, in S178, the high-order multiplier 50 determines whether k is 0 or not. In a case where k is 0 (No in S178), in S179, the high-order multiplier 50 sets $P_2$ calculated by Equation (36) as the second high-order multiplication value ($M_2$). In a case where k is not 0 (No in S178), in S180, the high-order multiplier 50 multiplies $P_2$ calculated by Equation (36) by −1 to calculate the second high-order multiplication value ($M_2$). Upon completion of the processing in S179 or S180, the high-order multiplier 50 ends the calculation of ($w_i(k) \cdot x_i$).

Figure 12:
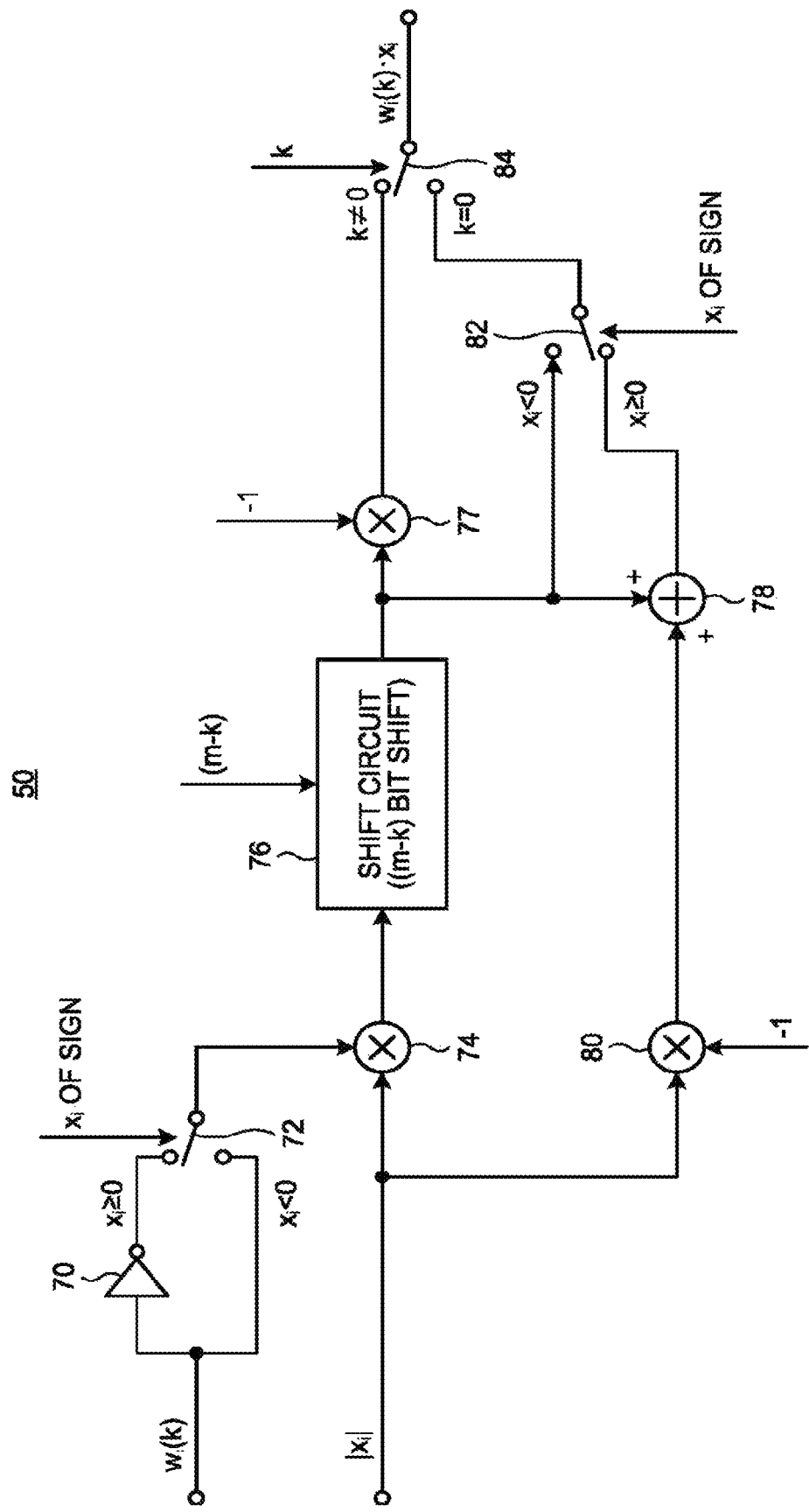
FIG. 12 is a configuration diagram of a high-order multiplier that executes the second operation expression.

FIG. 12 is a diagram illustrating the configuration of the high-order multiplier 50 realized by a circuit that executes the second operation expression. The high-order multiplier 50 realized by the circuit that executes the second operation expression has the configuration illustrated in FIG. 12, for example.

The high-order multiplier 50 includes the inverter 70, the first switch 72, the first multiplier 74, the shift circuit 76, the second multiplier 77, the adder 78, a third multiplier 80, the second switch 82, and the third switch 84.

The inverter 70 bit-inverts the value ($w_i(k)$) of the target digit (k) in the coefficient ($w_i$). The first switch 72 selects and outputs the output value of the inverter 70 when the input value ($x_i$) is 0 or more. The first switch 72 selects and outputs the value ($w_i(k)$) of the target digit (k) in the coefficient ($w_i$) when the input value ($x_i$) is smaller than 0.

The first multiplier 74 multiplies the absolute value ($|x_i|$) of the input value ($x_i$) by the output value of the first switch 72. The shift circuit 76 left-bit-shifts the output value of the first multiplier 74 by (m-k) bits. The second multiplier 77 multiplies the output value of the shift circuit 76 by −1.

The third multiplier 80 multiplies the absolute value ($|x_i|$) of the input value ($x_i$) by −1. The adder 78 adds the output value of the shift circuit 76 and the output value of the third multiplier 80.

The second switch 82 selects and outputs the output value of the shift circuit 76 when the input value ($x_i$) is smaller than 0. The second switch 82 selects and outputs the output value of the adder 78 when the input value ($x_i$) is 0 or more.

The third switch 84 selects and outputs the output value of the second multiplier 77 when the target digit (k) is not 0. When the target digit (k) is 0, the third switch 84 selects and outputs the output value of the second switch 82. Then, the high-order multiplier 50 outputs the output value of the third switch 84 as ($w_i(k) \cdot x_i$).

Figure 13:
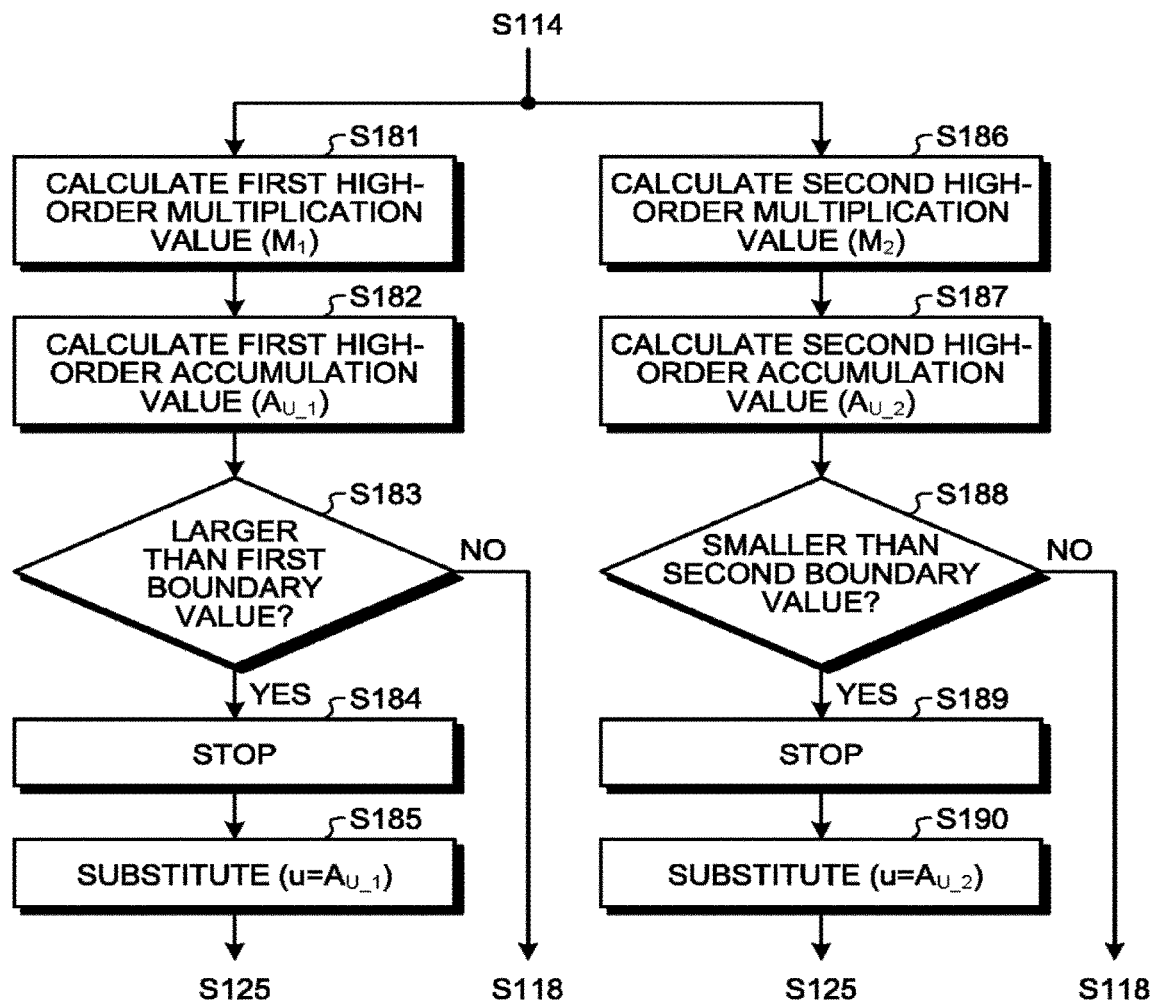
FIG. 13 is a flowchart illustrating processing of a sum-of-products calculator according to a modification.

FIG. 13 is a flowchart illustrating processing of the sum-of-products calculator 20 according to a modification. The high-order multiplier 50 and the low-order multiplier 54 have both a circuit that executes the first operation expression and the circuit that executes the second operation expression, and may execute the processing in the above circuits in parallel.

When both the multiplication processing based on the first operation expression and the multiplication processing based on the second operation expression are executed in parallel, the sum-of-products calculator 20 executes the processing illustrated in FIG. 13 instead of the processing in S115, S116, S117, S123 and S124 illustrated in FIG. 5.

Following the processing in S114, the high-order multiplier 50 executes S181. In S181, the high-order multiplier 50 calculates the first high-order multiplication value ($M_1$) by the circuit that executes the first operation expression. Subsequently, in S182, the high-order accumulator 52 accumulates the first high-order multiplication value ($M_1$). That is, the high-order accumulator 52 adds the first high-order multiplication value ($M_1$) to the first high-order accumulation value ($A_{U\_1}$) before calculation and updates the first high-order multiplication value ($A_{U\_1}$). Note that the first high-order accumulation value ($A_{U\_1}$) is initialized to 0 before the start of the flow.

Subsequently, in S183, the comparator 58 determines whether or not the first high-order accumulation value ($A_{U\_1}$) is larger than the first boundary value. When the first high-order accumulation value ($A_{U\_1}$) is not larger than the first boundary value (No in S183), the comparator 58 advances the processing to S118 in FIG. 5.

When the first high-order accumulation value ($A_{U\_1}$) is larger than the first boundary value (Yes in S183), the comparator 58 advances the processing to S184. In S184, the controller 46 stops the processing by the high-order multiplier 50 and the high-order accumulator 52 and the processing by the low-order multiplier 54 and the low-order accumulator 56.

Subsequently, in S185, the output unit 60 substitutes the first high-order accumulation value ($A_{U\_1}$) into the intermediate value (u) which is the multiplication accumulation value. Upon completion of the processing in S185, the output unit 60 advances the processing to S125 illustrated in FIG. 5.

The sum-of-products calculator 20 also executes the processing in S186 to S190 in parallel with the processing in S181 to S185. Following the processing in S114, in S186, the high-order multiplier 50 calculates the second high-order multiplication value ($M_2$) by the circuit that executes the second operation expression. Subsequently, in S187, the high-order accumulator 52 accumulates the second high-order multiplication value ($M_2$). That is, the high-order accumulator 52 adds the second high-order multiplication value ($M_2$) to the second high-order accumulation value ($A_{U\_2}$) and updates the second high-order accumulation value ($A_{U\_2}$). Note that the second high-order accumulation value ($A_{U\_2}$) is initialized to 0 before the start of the flow.

Subsequently, in S188, the comparator 58 determines whether or not the second high-order accumulation value ($A_{U\_2}$) is smaller than the second boundary value. When the second high-order accumulation value ($A_{U\_2}$) is not smaller than the second boundary value (No in S188), the comparator 58 advances the processing to S118 illustrated in FIG. 5.

When the second high-order accumulation value ($A_{U\_2}$) is larger than the second boundary value (Yes in S188), the comparator 58 advances the processing to S189. In S189, the controller 46 stops the processing by the high-order multiplier 50 and the high-order accumulator 52 and the processing by the low-order multiplier 54 and the low-order accumulator 56.

Subsequently, in S190, the output unit 60 substitutes the second high-order accumulation value ($A_{U\_2}$) into the intermediate value (u) which is the multiplication accumulation value. Upon completion of the processing in S190, the output unit 60 advances the processing to S125 illustrated in FIG. 5.

The sum-of-products calculator 20 according to such a modification can detect the case where the intermediate value is the positive-side saturation region and the case where the intermediate value is the negative-side saturation region. The sum-of-products calculator 20 according to the modification can achieve high-speed processing and low power consumption in both cases where the intermediate value is the positive-side saturation region and the intermediate value is the negative-side saturation region.

Note that the low-order multiplier 54 may be provided with either the circuit that executes the first operation expression or the circuit that executes the second operation expression. When the low-order multiplier 54 includes the circuit that executes the first operation expression, the output unit 60 adds the low-order accumulation value ($A_L$) calculated by the low-order accumulator 56 and the first high-order accumulation value ($A_{U\_1}$), to calculate the accumulation multiplication value. Furthermore, when the low-order multiplier 54 includes the circuit that executes the second operation expression, the output unit 60 adds the low-order accumulation value ($A_L$) calculated by the low-order accumulator 56 and the second high-order accumulation value ($A_{U\_2}$), to calculate the accumulation multiplication value. Note that any accumulation multiplication value has the same value.

Figure 14:
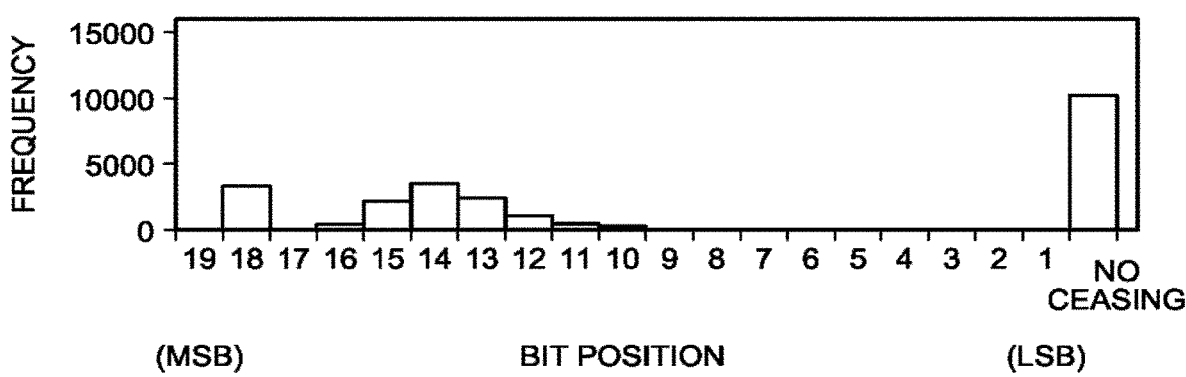
FIG. 14 is a view illustrating a relationship between a bit position where processing of calculating a high-order accumulation value is halfway completed and a frequency.

FIG. 14 is a view illustrating a relationship between a bit position where processing of calculating a high-order accumulation value is halfway completed and a frequency.

The multiplication accumulation processing executed by the high-order multiplier 50 and the high-order accumulator 52 is set as high-order digit processing. The processing time for each digit in the high-order digit processing is TM. For example, when the number of digits from the most significant digit to the stopped digit is S, the time required for the high-order digit processing is S×TM at the longest. In the high-order digit processing, when the high-order accumulation value exceeds the boundary value in the middle, the processing is ceased. When the ceasing occurs at the fourth digit from the most significant digit, the time for the high-order digit processing is 4×TM. Also, for example, if the stop digit is the 19th digit from the most significant digit and the ceasing does not occur, the time for the high-order digit processing is 19×TM.

The multiplication accumulation processing executed by the low-order multiplier 54 and the low-order accumulator 56 is set as low-order digit processing. The processing time for each digit in the low-order digit processing is TL. The controller 46 controls the start timing of the low-order digit processing. For example, the controller 46 may start the low-order digit processing after the high-order digit processing reaches the stop digit. When the low-order digit processing is started after the high-order digit processing reaches the stop digit, the total processing time in the sum-of-products calculator 20 is (S×TM)+TL for the longest.

When the low-order digit processing is not executed (that is, when the high-order digit processing is executed from the most significant digit to the least significant digit of the coefficient), the processing time (worst case processing time) for the sum-of-products calculator 20 is L×TM. Here, L is the number of digits of the coefficient. When the low-order digit processing is started after the high-order digit processing reaches the stop digit, (L×TM)−{(S×TM)+TL}=(L−S)×TM−TL is obtained from the worst case of the processing time for the sum-of-products calculator 20. Therefore, even when the low-order digit processing starts after the high-order digit processing reaches the stop digit, when the time (TL) for low-order digit processing is shorter than the time ((L−S)×TM) for executing the digit lower than the stop digit in the high-order digit processing, a reduction effect is produced.

In the example in FIG. 14, it is illustrated that about half of the processing are terminated halfway by the 8th bit (12th bit counted from the MSB). Therefore, in such a case, a designer may set, for example, the 8th bit (12th bit from the MSB) as the stop digit.

In such a case, the controller 46 may start the low-order digit processing so that the low-order digit processing for the low-order 7 bits is completed before the high-order digit processing for the high-order 12 bits is completed. That is, the controller 46 may start the low-order digit processing at the timing of completing the low-order digit processing before the high-order digit processing reaches the stop digit.

In this case, the total processing time in the sum-of-products calculator 20 is (12×TM) at the longest. When the low-order digit processing is completed before the high-order digit processing reaches the stop digit, (L×TM)−(S×TM)=(L−S)×TM is obtained from the worst case of the processing time for the sum-of-products calculator 20.

Note that the controller 46 may start the low-order digit processing at the timing slower than the timing of completing the low-order digit processing before the high-order digit processing reaches the stop digit. In this case, the processing time for the sum-of-products calculator 20 is (S×TM)+α. Here, α is the remaining time from the time when the high-order digit processing reaches the stop digit to the time when the low-order digit processing is completed. Even in such a case, the sum-of-products calculator 20 can reduce processing time. For example, in this case, the reduction time from the worst case of the processing time of the sum-of-products calculator 20 is (L×TM)−{(S×TM)+α}={(L−S)×TM}−α.

The total processing time in the sum-of-products calculator 20 is changed according to the number of digits from the most significant digit to the stop digit. That is, as the stop digit is set to the lower order digit, the overall processing time becomes longer, and as the stop digit is set to the higher order digit, the overall processing time becomes shorter.

In addition, the value of the coefficient on the lower than the stop digit is stored in the memory with poor read accuracy than the value of the coefficient higher than the stop digit. Therefore, as the stop digit is set to the low-order digit, the overall calculation precision increases and as the stop digit is set to the high-order digit, the overall calculation precision becomes lower. Therefore, the designer can appropriately set the stop digit according to the required processing time, the format of the fixed point representation of the input value and the coefficient (the position of the decimal point), and the required calculation precision.

Figure 15:
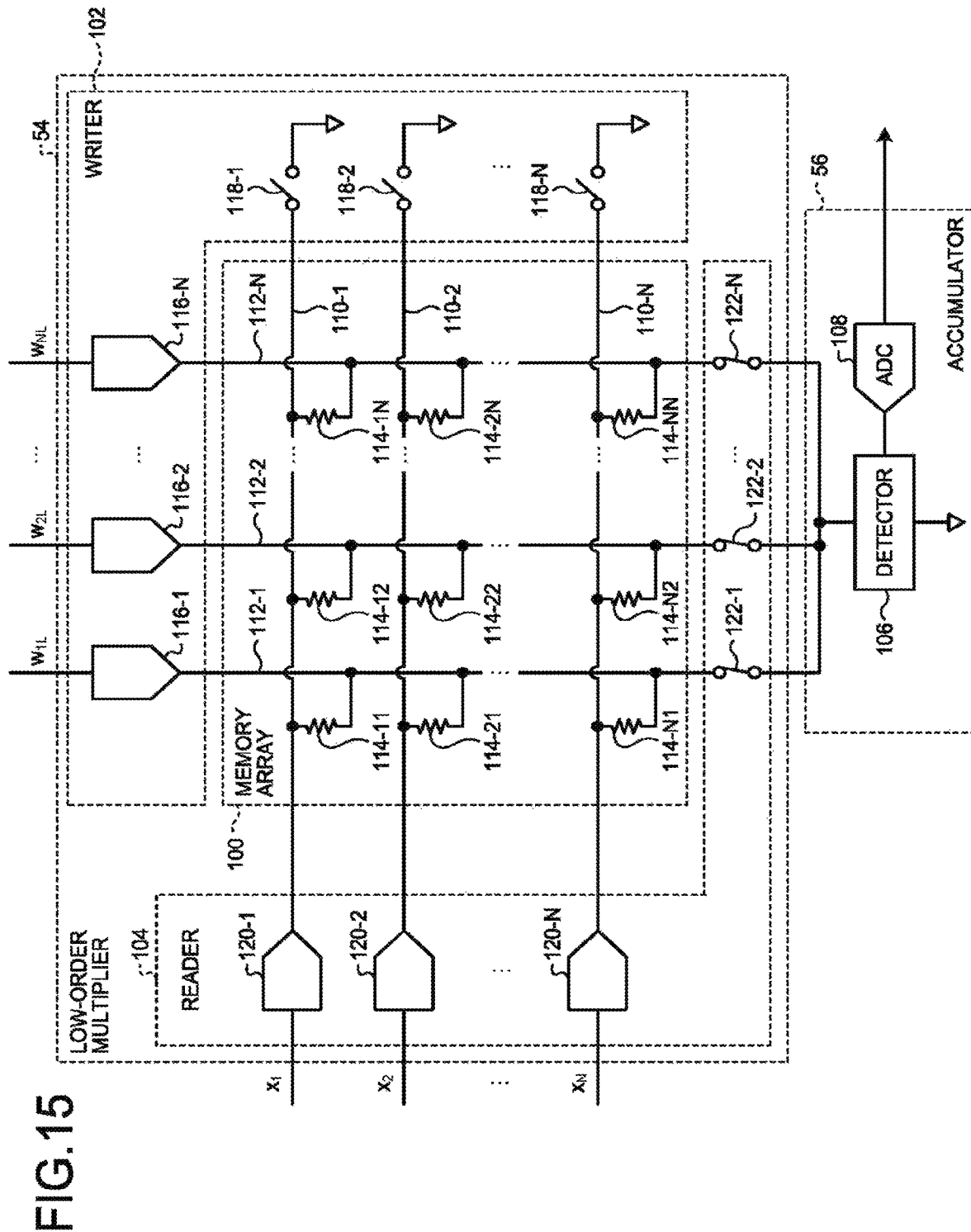
FIG. 15 is a configuration diagram of a high-order multiplier and a low-order multiplier using a resistive random access memory.

FIG. 15 illustrates a configuration example of the low-order multiplier 54 and the low-order accumulator 56 using a resistive random access memory 114. The low-order multiplier 54 and the low-order accumulator 56 may have a configuration as illustrated in FIG. 15, for example.

The low-order multiplier 54 includes a memory array 100, a writer 102, and a reader 104. The memory array 100 has N row lines 110 (110-1 to 110-N) and N column lines 112 (112-1 to 112-N).

Each of the N row lines 110 corresponds to each of the N input values. For example, the first row line 110-1 corresponds to $x_1$. The second row line 110-2 corresponds to $x_2$. The Nth row line 110-N corresponds to $x_N$.

Each of the N column lines 112 corresponds to each of the N coefficients. For example, the first column line 112-1 corresponds to $w_1$. The second column line 112-2 corresponds to $w_2$. The Nth column line 112-N corresponds to $w_N$.

Further, the memory array 100 has the plurality of resistive random access memories 114. In the plurality of resistive random access memories 114, the resistance value changes at the time of writing and is set to a resistance value according to the applied voltage. Further, at the time of reading, the plurality of resistive random access memories 114 does not change the resistance value but function as resistors of the set resistance value.

The plurality of resistive random access memories 114 corresponds to each of a plurality of coefficients. That is, the memory array 100 has (N×N) resistive random access memories 114. More specifically, the memory array 100 has N resistive random access memories 114 corresponding to each of the N coefficients for each of the N input values. For example, the memory array 100 has N resistive random access memories 114 (114-11, 114-12, . . . 114-1N) for $x_1$. Furthermore, the memory array 100 has N resistive random access memories 114 (114-21, 114-22, . . . 114-2N) for $x_2$. Also, the memory array 100 has N resistive random access memories 114 (114-N1, 114-N2, . . . 114-NN) for $x_3$.

The (N×N) resistive random access memories 114 are connected between the row line 110 corresponding to the corresponding input value and the column line 112 corresponding to the corresponding coefficient.

For example, the resistive random access memory 114-11 corresponding to $x_1$ and $w_1$ is connected between the first row line 110-1 and the first column line 112-1. For example, the resistive random access memory 114-21 corresponding to $x_2$ and $w_1$ is connected between the second row line 110-2 and the first column line 112-1. For example, the resistive random access memory 114-N1 corresponding to $x_N$ and $w_1$ is connected between the Nth row line 110-N and the first column line 112-1.

For example, the resistive random access memory 114-12 corresponding to $x_1$ and $w_2$ is connected between the first row line 110-1 and the second column line 112-2. For example, the resistive random access memory 114-22 corresponding to $x_2$ and $w_2$ is connected between the second row line 110-2 and the second column line 112-2. For example, the resistive random access memory 114-N2 corresponding to $x_N$ and $w_2$ is connected between the Nth row line 110-N and the second column line 112-2.

For example, the resistive random access memory 114-1N corresponding to $x_1$ and $w_N$ is connected between the first row line 110-1 and the Nth column line 112-N. For example, the resistive random access memory 114-2N corresponding to $x_2$ and $w_N$ is connected between the second row line 110-2 and the Nth column line 112-N. For example, the resistive random access memory 114-NN corresponding to $x_N$ and $w_N$ is connected between the Nth row line 110-N and the Nth column line 112-N.

Prior to the multiplication, the writer 102 sets each of the plurality of resistive random access memories 114 to conductance (reciprocal of resistance) according to the corresponding coefficient. For example, the writer 102 applies a voltage to each resistive random access memory 114 so as to have a conductance according to a digit value smaller than the stop digit in the corresponding coefficient.

For example, the writer 102 includes N coefficient voltage generation units 116 (116-1 to 116-N) and N row line switches 118 (118-1 to 118-N). Each of the N coefficient voltage generation units 116 applies a voltage to each of the N column lines 112 (112-1 to 112-N). Each of the N row line switches 118 (118-1 to 118-N) connects each of the N row lines 110 (110-1 to 110-N) to a predetermined potential at the time of writing.

The first coefficient voltage generation unit 116-1 applies a voltage according to $w_{1L}$, which is a digit smaller than the stop digit at $w_1$, to the first column line 112-1. Accordingly, the resistive random access memory 114 (114-11, 114-21, . . . , 114-N1) corresponding to $w_1$ is set to the conductance corresponding to $w_{1L}$.

The second coefficient voltage generation unit 116-2 applies a voltage according to $w_{2L}$, which is a digit smaller than the stop digit at $w_2$, to the second column line 112-2. As a result, the resistive random access memories 114 (114-12, 114-22, . . . , 114-N2) corresponding to $w_2$ are set to the conductance corresponding to $w_{2L}$.

The Nth coefficient voltage generation unit 116-N applies a voltage according to $w_{NL}$, which is a value smaller than the stop digit of $w_N$, to the Nth column line 112-N. As a result, the resistive random access memories 114 (114-1N, 114-2N, . . . , 114-NN) corresponding to $w_N$ are set to the conductance corresponding to $w_{NL}$.

When performing reading (at the time of multiplication), the writer 102 opens between the N row lines 110 and the writer 102 and between the N column lines 112 and the writer 102.

The reader 104 applies a voltage according to the corresponding input value to each of the plurality of resistive random access memories 114. Each of the plurality of resistive random access memories 114 is set to a conductance according to the corresponding coefficient. Accordingly, the plurality of resistive random access memories 114 can apply a current according to the value obtained by multiplying the corresponding input value by the corresponding coefficient.

For example, the reader 104 includes N input voltage generation units 120 (120-1 to 120-N) and N column line switches 122 (122-1 to 122-N). Each of the N input voltage generation units 120 applies a voltage to each of the N row lines 110 (110-1 to 110-N). Each of the N column line switches 122 (118-1 to 118-N) connects each of the N column lines 112 (112-1 to 112-N) to a predetermined potential.

The first input voltage generator 120-1 applies a voltage according to $x_1$ to the first row line 110-1. As a result, a voltage according to $x_1$ is applied to the resistive random access memories 114 (114-11, 114-12, . . . , 114-1N) corresponding to $x_1$.

The second input voltage generation unit 120-2 applies a voltage according to $x_2$ to the second row line 110-2. As a result, a voltage according to $x_2$ is applied to the resistive random access memories 114 (114-21, 114-22, . . . , 114-2N) corresponding to $x_2$.

The Nth input voltage generation unit 120-N applies a voltage according to $x_N$ to the Nth row line 110-N. As a result, a voltage according to $x_N$ is applied to the resistive random access memories 114 (114-N1, 114-N2, . . . , 114-NN) corresponding to $x_N$.

In this way, each of the (N×N) resistive random access memories 114 can apply a current value obtained by multiplying the corresponding input value by the value of the digit smaller than the stop digit in the corresponding coefficient. That is, the resistive random access memory 114-$ii$ corresponding to the i-th input value and the i-th coefficient can apply a current according to $(x_i \times w_{iL})$.

Note that when performing writing, the reader 104 opens between the N row lines 110 and the reader 104 and between the N column lines 112 and the reader 104.

The low-order accumulator 56 detects the sum of the currents flowing through the plurality of resistive random access memories 114 as the low-order accumulation value.

For example, the low-order accumulator 56 includes a detector 106 and an ADC 108. The detector 106 adds the currents flowing through each of the N column lines 112. For example, the detector 106 may be a microresistor having one end connected to each of the N column lines 112 and the other end connected to a predetermined potential. The ADC 108 AD-converts a composite current detected by the detector 106 and converts it into a digital value. For example, when the detector 106 is a microresistor, the ADC 108 converts the voltage value of the microresistor into a digital value. Then, the ADC 108 outputs a value obtained by dividing the output digital value by the resistance value of the microresistor as the low-order accumulation value.

With such a configuration, the low-order multiplier 54 and the low-order accumulator 56 can execute the multiplication processing and the accumulation processing at a high speed.

The high-order multiplier 50 and the high-order accumulator 52 may have the same configuration as in FIG. 15. In this case, the writer 102 may set the value of the corresponding bit in the coefficient to the conductance of each resistive random access memory 114 prior to the multiplication.

Figure 16:
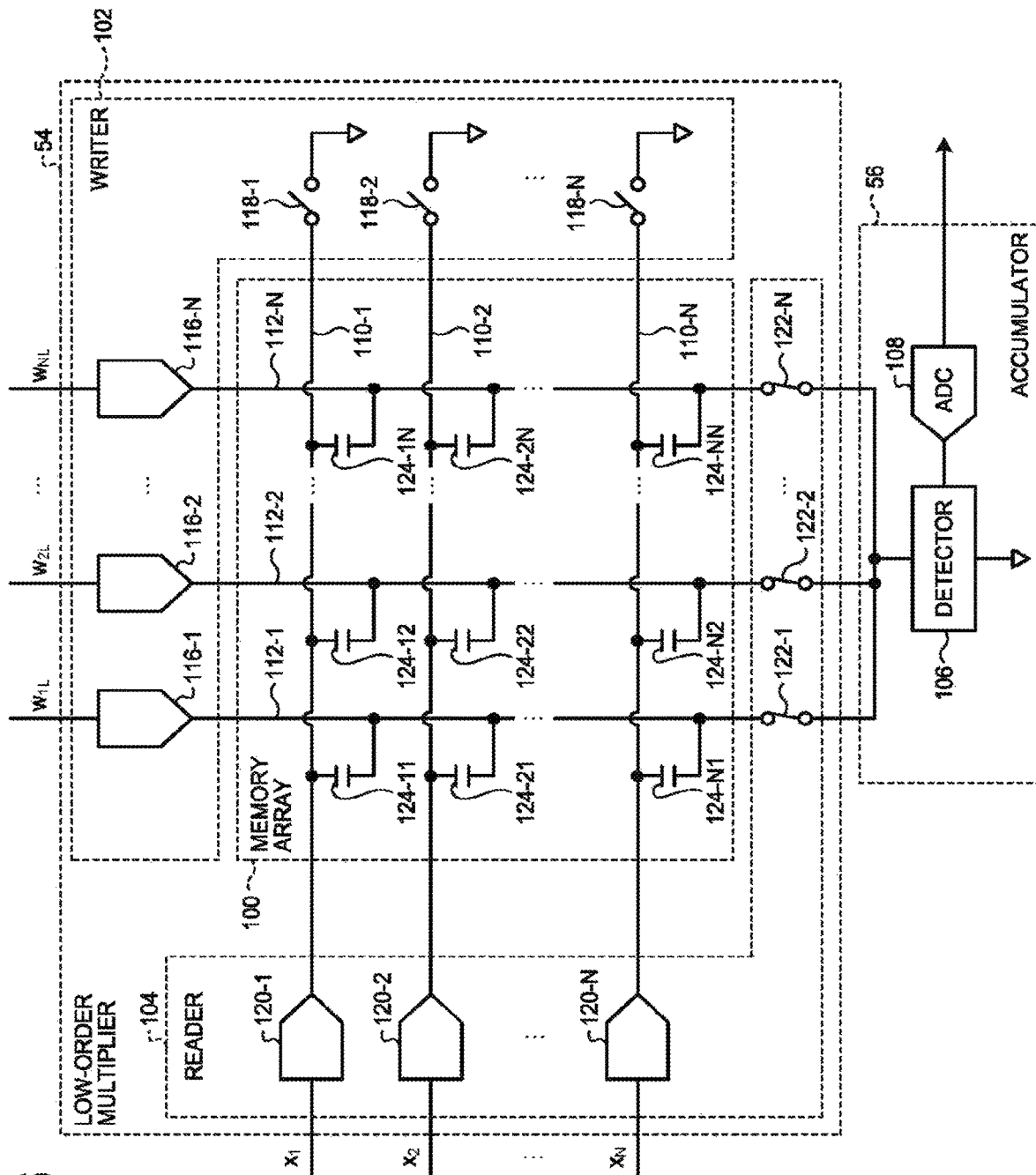
FIG. 16 is a configuration diagram of a high-order multiplier and a low-order multiplier using a capacitive coupling memory.

FIG. 16 illustrates a configuration example of the low-order multiplier 54 and the low-order accumulator 56 using a capacitive coupling memory 124. The low-order multiplier 54 and the low-order accumulator 56 may have a configuration as illustrated in FIG. 16, for example.

The low-order multiplier 54 illustrated in FIG. 16 has the capacitive coupling memory 124 instead of the resistive random access memory 114 in the configuration illustrated in FIG. 15. At the time of writing, the capacitances of the plurality of capacitive coupling memories 124 change and the capacitance is set according to the applied voltage. In addition, the plurality of capacitive coupling memories 124 do not change in capacitance at the time of reading, but function as a capacitor having a set capacitance.

Prior to the multiplication, the writer 102 sets each of the plurality of capacitive coupling memories 124 to a capacitance according to the corresponding coefficient. For example, the writer 102 applies a voltage to each of the capacitive coupling memories 124 so as to have a capacitance according to a digit value smaller than the stop digit in the corresponding coefficient.

As a result, the capacitive coupling memory 124 (124-11, 124-21, . . . , 124-N1) corresponding to $w_1$ is set to a capacitance corresponding to $w_{1L}$. Also, the capacitive coupling memory 124 (124-12, 124-22, . . . , 124-N2) corresponding to $w_2$ is set to a capacitance corresponding to $w_{2L}$. Also, the capacitive coupling memory 124 (124-1N, 124-2N, . . . , 124-NN) corresponding to $w_N$ is set to a capacitance corresponding to $w_{NL}$.

The reader 104 applies a voltage according to the input value corresponding to each of the plurality of capacitive coupling memories 124. Each of the plurality of capacitive coupling memories 124 is set to a capacitance according to the corresponding coefficient. Accordingly, the plurality of capacitive coupling memories 124 can accumulate an electric charge corresponding to the value obtained by multiplying the corresponding input value by the corresponding coefficient.

The first input voltage generator 120-1 applies a voltage according to $x_1$ to the first row line 110-1. Accordingly, a voltage according to $x_1$ is applied to the capacitive coupling memory 124 (124-11, 124-12, . . . , 124-1N) corresponding to $x_1$.

The second input voltage generation unit 120-2 applies a voltage according to $x_2$ to the second row line 110-2. As a result, a voltage according to $x_2$ is applied to the capacitive coupling memory 124 (124-21, 124-22, . . . , 124-2N) corresponding to $x_2$.

The Nth input voltage generation unit 120-N applies a voltage according to $x_N$ to the Nth row line 110-N. As a result, a voltage according to $x_N$ is applied to the capacitive coupling memory 124 (124-N1, 124-N2, . . . , 124-NN) corresponding to $x_N$.

As a result, each of the (N×N) capacitive coupling memories 124 can accumulate a charge corresponding to a value obtained by multiplying the corresponding input value by the value of the digit smaller than the stop digit in the corresponding coefficient. That is, the capacitive coupling memory 124-ii corresponding to the i-th input value and the i-th coefficient can accumulate a charge corresponding to $(x_i \times w_{iL})$.

The low-order accumulator 56 detects a value obtained by summing the charges accumulated in each of the plurality of capacitive coupling memories 124 as a low-order accumulation value.

For example, the detector 106 is an inverter circuit including two FETs (field effect transistors). A gate terminal of the inverter circuit is connected to each of the N column lines 112. When a voltage applied to a capacitor is V and a capacitance of the capacitor is w, a charge accumulated in the capacitor is w×V. In addition, all capacitive coupling memories 124 are connected in parallel to the gate terminals of the inverter circuit, and as a whole, they appear as one capacitor. When charges are accumulated in the capacitor connected to the gate terminal of the inverter circuit, the potential of the gate terminal rises due to the accumulated charge. Therefore, the ADC 108 can output a digital value representing the low-order accumulation value by measuring the rise in the potential at the output end of the inverter circuit.

With such a configuration, the low-order multiplier 54 and the low-order accumulator 56 can execute the multiplication processing and the accumulation processing at a high speed.

The high-order multiplier 50 and high-order accumulator 52 may have the same configuration as that of FIG. 16. In this case, the writer 102 may set the value of the corresponding bit in the coefficient to the capacitance of each capacitive coupling memory 124 prior to the multiplication.

Figure 17:
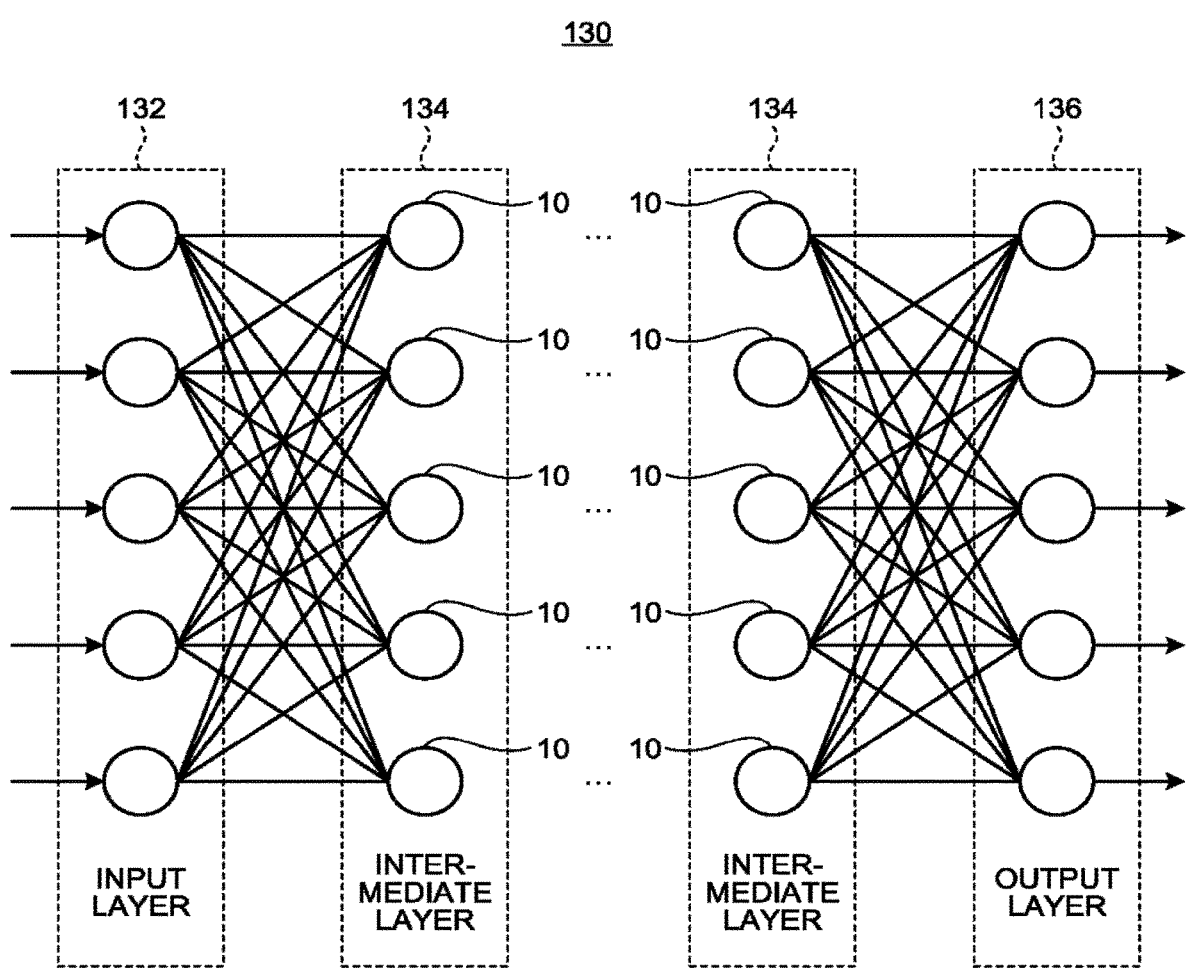
FIG. 17 is a configuration diagram of a network apparatus.

FIG. 17 is a diagram illustrating a configuration of a network device 130. The network unit 10 is applied to, for example, the network device 130 constituting a neural network as illustrated in FIG. 17.

The network device 130 includes a plurality of subordinately connected layers. For example, the network device 130 includes an input layer 132, at least one intermediate layer 134, and an output layer 136. Each of the input layer 132, the intermediate layer 134, and the output layer 136 executes acquisition processing of at least one signal, operation processing on the acquired signal, and output processing of at least one signal.

The input layer 132, the at least one intermediate layer 134 and the output layer 136 are connected in series. The input layer 132 receives a signal value from the outside and executes operation processing. Then, the input layer 132 outputs at least one signal value obtained as an operation result to the intermediate layer 134 of the next stage.

In addition, each intermediate layer 134 executes operation processing on at least one signal value received from the preceding stage. Then, each intermediate layer 134 outputs at least one signal value obtained as an operation result to the intermediate layer 134 or the output layer 136 of the next stage. In addition, each intermediate layer 134 may have a return path for feeding back a signal to the intermediate layer 134.

The output layer 136 executes operation processing on the signal value received from the intermediate layer 134 in the preceding stage. Then, the output layer 136 outputs a probability value or the like as an operation result. For example, the output layer 136 executes an operation using a soft max function.

Then, any layer of the input layer 132, at least one intermediate layer 134, and output layer 136 includes at least one network unit 10. The network unit 10 included in any layer receives N signal values output from the immediately preceding layer as input values. In addition, the network unit 10 included in any layer outputs the output value as a signal value to the next stage or outside.

As described above, the network unit 10 and the sum-of-products calculator 20 according to the present embodiment can output the output value efficiently by giving the activation function circuit 30 an intermediate value with appropriate accuracy. That is, when outputting an intermediate value (multiplication accumulation value) to be the saturation region of the activation function, the sum-of-products calculator 20 executes processing with low accuracy but high speed and low power consumption In addition, the sum-of-products calculator 20 can execute processing with high accuracy when outputting an intermediate value (multiplication accumulation value) which is a transient region of an activation function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A multiplier accumulator comprising:
   a coefficient storage configured to store N coefficients corresponding to N input values on a one-to-one basis, each coefficient having a value indicating a sign at a most significant digit, where N is an integer equal to or greater than two;
   a controller configured to designate each of a plurality of digits included in the N coefficients and within a range of the most significant digit to a stop digit that is predetermined as a target digit;
   a high-order multiplier configured to calculate a high-order multiplication value obtained by multiplying a corresponding input value, a value of the target digit in a corresponding coefficient, and a weight of the target digit, for each of the N input values;
   a high-order accumulator configured to calculate a high-order accumulation value obtained by accumulatively adding the high-order multiplication value calculated for the N input values;
   a low-order multiplier configured to calculate a low-order multiplication value by multiplying a corresponding input value and a value of a digit smaller than the stop digit in a corresponding coefficient, for each of the N input values; and
   an output circuit configured to output a multiplication accumulation value, wherein
      when the high-order accumulation value exceeds a boundary value that is preset, the output circuit outputs a value in a range after passing the boundary value as the multiplication accumulation value, and
      when the high-order accumulation value does not exceed the boundary value even when the high-order multiplication value is calculated by designating the stop digit as the target digit, the output circuit outputs a value obtained by adding, to the high-order accumulation value, a low-order accumulation value obtained by accumulatively adding the low-order multiplication value calculated for the N input values, as the multiplication accumulation value.

2. The multiplier accumulator according to claim 1, wherein
   the high-order multiplier calculates the high-order multiplication value by a circuit configured to execute a first operation expression in which a multiplication result of a digit lower than the most significant digit and a corresponding input value is 0 or positive, and
   the low-order multiplier calculates the low-order multiplication value by the circuit configured to execute the first operation expression.

3. The multiplier accumulator according to claim 2, wherein
   when the high-order accumulation value is larger than a first boundary value that is preset, the output circuit outputs a value larger than the first boundary value as the multiplication accumulation value, and
   when the high-order accumulation value is not larger than the first boundary value even when the high-order multiplication value is calculated by designating the stop digit as the target digit, the output circuit outputs a value obtained by adding the low-order accumulation value to the high-order accumulation value as the multiplication accumulation value.

4. The multiplier accumulator according to claim 1, wherein
   the high-order multiplier calculates the high-order multiplication value by a circuit configured to execute a second operation expression in which a multiplication result of a digit lower than the most significant digit and a corresponding input value is 0 or negative, and
   the low-order multiplier calculates the low-order multiplication value by the circuit configured to execute the second operation expression.

5. The multiplier accumulator according to claim 4, wherein
   when the high-order accumulation value is smaller than a second boundary value that is preset, the output circuit outputs a value smaller than the second boundary value as the multiplication accumulation value, and
   when the high-order accumulation value is not smaller than the second boundary value even when the high-order multiplication value is calculated by designating the stop digit as the target digit, the output circuit outputs a value obtained by adding the low-order accumulation value to the high-order accumulation value as the multiplication accumulation value.

6. The multiplier accumulator according to claim 1, wherein
the controller sequentially designates each of a plurality of digits within the range of the most significant digit to the stop digit as the target digit from a higher order, and designates a new target digit after calculating every high-order multiplication value of the N input values for the designated new target digit, and
the high-order multiplier calculates the high-order multiplication value each time the target digit is designated.

7. The multiplier accumulator according to claim 6, wherein when the high-order accumulation value exceeds the boundary value, the controller stops multiplication processing by the high-order multiplier and the low-order multiplier.

8. The multiplier accumulator according to claim 1, wherein
the coefficient storage includes
a first memory configured to store a value of the stop digit and a value of a digit higher than the stop digit in each of the N coefficients, and
a second memory configured to store a value of a digit lower than the stop digit in each of the N coefficients, and
the first memory allows reading the values of the N coefficients in a unit of digit.

9. The multiplier accumulator according to claim 8, wherein a power supply voltage lower than a power supply voltage applied to the first memory is applied to the second memory.

10. The multiplier accumulator according to claim 1, wherein each of the N coefficients is binary number data represented by 2's complement representation.

11. The multiplier accumulator according to claim 10, wherein
each of the N input values is data including a sign, and
each time the target digit is designated, the high-order multiplier calculates, for each of the N input values, the high-order multiplication value by multiplying an absolute value of a corresponding input value, a value obtained by inverting the value of the target digit in a corresponding coefficient according to a sign of the corresponding input value, and the weight of the target digit.

12. The multiplier accumulator according to claim 1, wherein the low-order multiplier starts processing after processing by the high-order multiplier is completed.

13. The multiplier accumulator according to claim 1, wherein the low-order multiplier executes processing in parallel with processing by the high-order multiplier.

14. The multiplier accumulator according to claim 13, wherein the low-order multiplier starts processing when a predetermined digit is designated as the target digit.

15. The multiplier accumulator according to claim 1, wherein
at least one of the high-order multiplier and the low-order multiplier includes
a memory array having a plurality of resistive random access memories respectively corresponding to a plurality of coefficients,
a writer configured to set each of the plurality of resistive random access memories to a conductance according to a corresponding coefficient prior to multiplication, and
a reader configured to apply a voltage according to an input value corresponding to each of the plurality of resistive random access memories.

16. The multiplier accumulator according to claim 1, wherein
at least one of the high-order multiplier and the low-order multiplier includes
a memory array having a plurality of capacitive coupling memories respectively corresponding to a plurality of coefficients,
a writer configured to set each of the plurality of capacitive coupling memories to a capacitance according to a corresponding coefficient prior to multiplication, and
a reader configured to apply a voltage according to an input value corresponding to each of the plurality of capacitive coupling memories.

17. A network unit comprising:
a multiplier accumulator configured to output a multiplication accumulation value obtained by accumulating N multiplication values obtained by multiplying each of N input values and a corresponding coefficient, where N is an integer equal to or greater than two; and
an activation function circuit configured to convert an intermediate value as the multiplication accumulation value into an output value based on a function in which a value of a dependent variable becomes saturated as an absolute value of an independent variable becomes large, wherein
the multiplier accumulator includes
a coefficient storage configured to store N coefficients corresponding to the N input values on a one-to-one basis, each coefficient having a value indicating a sign at a most significant digit;
a controller configured to designate each of a plurality of digits included in the N coefficients and within a range of the most significant digit to a stop digit that is predetermined as a target digit;
a high-order multiplier configured to calculate a high-order multiplication value obtained by multiplying a corresponding input value, a value of the target digit in a corresponding coefficient, and a weight of the target digit, for each of the N input values;
a high-order accumulator configured to calculate a high-order accumulation value obtained by accumulatively adding the high-order multiplication value calculated for the N input values;
a low-order multiplier configured to calculate a low-order multiplication value by multiplying a corresponding input value and a value of a digit smaller than the stop digit in a corresponding coefficient, for each of the N input values; and
an output circuit configured to output a multiplication accumulation value, wherein
when the high-order accumulation value exceeds a preset boundary value that is preset, the output circuit outputs a value in a range after passing the boundary value as the multiplication accumulation value, and
when the high-order accumulation value does not exceed the boundary value even when the high-order multiplication value is calculated by designating the stop digit as the target digit, the output circuit outputs a value obtained by adding, to the high-order accumulation value, a low-order accumulation value obtained by accumulatively adding the low-order multiplication value calculated for the N input values, as the multiplication accumulation value.

18. A network apparatus comprising a plurality of layers subordinately connected, wherein
  each of the plurality of layers includes at least one network unit according to claim 17, and
  the at least one network unit included in any one of the plurality of layers receives N signal values output from an immediately preceding layer as N input values.

* * * * *